US010644772B2

(12) United States Patent
Liu et al.

(10) Patent No.: US 10,644,772 B2
(45) Date of Patent: May 5, 2020

(54) TECHNIQUES FOR DETERMINING A NUMBER OF RECEIVE CHAINS TO ENABLE FOR A CHANNEL

(71) Applicant: QUALCOMM Incorporated, San Diego, CA (US)

(72) Inventors: Qijia Liu, San Diego, CA (US); Ashok Mantravadi, San Diego, CA (US); Jae Won Yoo, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/583,914

(22) Filed: May 1, 2017

(65) Prior Publication Data

US 2017/0324458 A1    Nov. 9, 2017

Related U.S. Application Data

(60) Provisional application No. 62/333,767, filed on May 9, 2016.

(51) Int. Cl.
*H04B 7/0456* (2017.01)
*H04L 5/00* (2006.01)
(Continued)

(52) U.S. Cl.
CPC ......... *H04B 7/0486* (2013.01); *H04B 7/0426* (2013.01); *H04B 7/0452* (2013.01);
(Continued)

(58) Field of Classification Search
CPC ..... H04L 5/006; H04L 5/0007; H04L 5/0023; H04L 5/0048; H04L 5/0073; H04L 1/0026; H04L 5/0094; H04L 5/0032; H04L 5/0057; H04L 5/0035; H04L 1/04; H04L 5/0005; H04L 5/0037; H04L 27/2601;
(Continued)

(56) References Cited

U.S. PATENT DOCUMENTS 9,332,557 B2   5/2016 Stager et al.
9,356,679 B2   5/2016 Mujtaba et al.
(Continued)

OTHER PUBLICATIONS

ISA/EP, International Search Report and Written Opinion of the International Searching Authority, Int'l Application No. PCT/US2017/030568, dated Jul. 13, 2017, European Patent Office, Rijswijk, NL, 16 pgs.

*Primary Examiner* — David C Payne
*Assistant Examiner* — Sarah Hassan
(74) *Attorney, Agent, or Firm* — Holland & Hart LLP

(57) ABSTRACT

Techniques are described for wireless communication at a wireless communication device. A determination may be made regarding the number of receive chains, of a plurality of receive chains, to enable for a channel. Power to the receive chains may be regulated based on the determined number of enabled receive chains. The determination may be based on a transmission scheduling rate for the wireless communication device and a rank for the channel. In some examples, the determination may further be based on a channel quality of the channel and/or a type of traffic scheduled for the channel.

28 Claims, 19 Drawing Sheets

(51) Int. Cl.
    *H04W 72/12*     (2009.01)
    *H04B 7/08*      (2006.01)
    *H04W 52/02*     (2009.01)
    *H04B 7/0452*    (2017.01)
    *H04B 7/0491*    (2017.01)
    *H04B 7/0426*    (2017.01)
    *H04B 7/0413*    (2017.01)

(52) U.S. Cl.
    CPC ......... *H04B 7/0491* (2013.01); *H04B 7/0817* (2013.01); *H04L 5/006* (2013.01); *H04L 5/0094* (2013.01); *H04W 52/0245* (2013.01); *H04W 72/1278* (2013.01); *H04B 7/0413* (2013.01); *Y02D 70/122* (2018.01); *Y02D 70/1222* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/23* (2018.01); *Y02D 70/24* (2018.01); *Y02D 70/444* (2018.01)

(58) Field of Classification Search
    CPC ..... H04L 27/2627; H04L 1/00; H04L 1/0029; H04L 1/0041
    USPC .......................................... 375/299; 370/252
    See application file for complete search history.

(56) References Cited

U.S. PATENT DOCUMENTS

| | | | |
|---|---|---|---|
| 9,474,075 B2 | 10/2016 | Yavuz et al. | |
| 2004/0235433 A1* | 11/2004 | Hugl | H04B 7/0608 455/101 |
| 2014/0098694 A1* | 4/2014 | Damji | H04W 52/0229 370/252 |
| 2014/0269373 A1* | 9/2014 | Nimmala | H04W 24/02 370/252 |
| 2015/0017940 A1* | 1/2015 | Soriaga | H04B 7/0802 455/278.1 |
| 2015/0271755 A1 | 9/2015 | Karri et al. | |
| 2016/0112992 A1* | 4/2016 | Bhushan | H04L 5/0042 370/330 |
| 2016/0198352 A1 | 7/2016 | Jarrahi et al. | |

* cited by examiner

TECHNIQUES FOR DETERMINING A NUMBER OF RECEIVE CHAINS TO ENABLE FOR A CHANNEL

CROSS REFERENCES

The present Application for Patent claims priority to U.S. Provisional Patent Application No. 62/333,767 by LIU, et al., entitled "Techniques For Determining A Number of Receive Chains To Enable For A Channel," filed May 9, 2016, assigned to the assignee hereof.

BACKGROUND

Field of the Disclosure

The present disclosure, for example, relates to wireless communication systems, and more particularly to techniques for determining a number of receive chains to enable for a channel.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some wireless communication devices (e.g., base stations and UEs) may employ multiple-input, multiple-output (MIMO) communication techniques to increase the capacity or noise tolerance of a wireless communication channel ("channel"). MIMO communication techniques may provide advantages (e.g., increased throughput or noise tolerance) under some conditions, but at a cost (e.g., greater power consumption or resource use).

SUMMARY

Because MIMO communication techniques may employ multiple transmit chains or receive chains, power and other resources may be conserved by disabling at least some transmit chains or receive chains. For example, a wireless communication device may disable a subset of its transmit chains or receive chains when higher order MIMO communication techniques are not in use or do not provide sufficient (or any) advantage. Techniques described in the present disclosure may be used to determine a number of receive chains to enable for a channel, and to regulate the power to the receive chains to adaptively enable (or disable) the receive chains. In some examples, the techniques may be applied to receive chains associated with higher order receive diversity (HORxD).

In one example, a method for wireless communication at a wireless communication device is described. The method may include determining a number of receive chains, of a plurality of receive chains, to enable for a channel. The determination may be based on a transmission scheduling rate for the wireless communication device, a channel quality of the channel, a rank for the channel, or a type of traffic scheduled for the channel. Power to the plurality of receive chains may be regulated based at least in part on the determined number of receive chains. In some cases, the determination may be based on a combination of a transmission scheduling rate for the wireless communication device and a rank for the channel. The determination may further be based at least in part on a type of traffic scheduled for the channel.

In some examples, the method may include comparing the rank for the channel to a threshold rank, and the determination of the number of receive chains to enable for the channel may be based at least in part on a result of the comparing. In some examples, determining the number of receive chains to enable for the channel, based at least in part on the comparing, may include determining to enable at least a predetermined number of the plurality of receive chains when the rank for the channel is higher than the threshold rank. In some examples, the predetermined number of the plurality of receive chains may include all of the plurality of receive chains. In some examples, the comparing may be performed after expiration of a time period following a prior determination of a number of receive chains to enable for the channel.

In some examples, the method may include comparing a scheduled rank for the channel to a threshold rank, and determining the number of receive chains to enable for the channel may include determining to enable at least a predetermined number of the plurality of receive chains when the scheduled rank for the channel is higher than the threshold rank. In some examples, the comparing may be performed upon receipt of the scheduled rank for the channel. In some examples, the comparing may be performed prior to receiving a transmission time interval (TTI) corresponding to the scheduled rank for the channel.

In some examples of the method, the rank for the channel may be based at least in part on: a scheduled rank for the channel, or a reported rank for the channel, or a combination thereof. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. In some examples, the determined number of receive chains may be two receive chains or four receive chains. In some examples, the channel may be configured for Long Term Evolution (LTE) communication.

In one example, an apparatus for wireless communication at a wireless communication device is described. The apparatus may include means for determining a number of receive chains, of a plurality of receive chains, to enable for a channel. The determination may be based at least in part on a transmission scheduling rate for the wireless communication device, a channel quality of the channel, a rank for the channel, or a type of traffic scheduled for the channel. The apparatus may also include means for regulating power to the plurality of receive chains based at least in part on the determined number of receive chains.

In some examples, the apparatus may include means for comparing the rank for the channel to a threshold rank, and the means for determining the number of receive chains to enable for the channel may further determine the number of receive chains to enable based at least in part on a result of the comparing. In some examples, the means for determining the number of receive chains to enable for the channel, based at least in part on the comparing, may include means for determining to enable at least a predetermined number of the plurality of receive chains when the rank for the channel is higher than the threshold rank. In some examples, the predetermined number of the plurality of receive chains may include all of the plurality of receive chains. In some examples, the means for comparing may perform the comparing after expiration of a time period following a prior determination of a number of receive chains to enable for the channel.

In some examples, the apparatus may include means for comparing a scheduled rank for the channel to a threshold rank, and the means for determining the number of receive chains to enable for the channel may include means for determining to enable at least a predetermined number of the plurality of receive chains when the scheduled rank for the channel is higher than the threshold rank. In some examples, the means for comparing may perform the comparing upon receipt of the scheduled rank for the channel. In some examples, the means for comparing may perform the comparing prior to receiving a transmission time interval corresponding to the scheduled rank for the channel.

In some examples of the apparatus, the rank for the channel may be based at least in part on: a scheduled rank for the channel, or a reported rank for the channel, or a combination thereof. In some examples, the means for regulating power to the plurality of receive chains may include at least one of: means for increasing power to a disabled receive chain included in the number of receive chains enabled for the channel, or means for decreasing power to an enabled receive chain not included in the number of receive chains enabled for the channel, or means for maintaining a power state of an enabled receive chain included in the number of receive chains enabled for the channel, or means for maintaining a power state of a disabled receive chain not included in the number of receive chains enabled for the channel. In some examples, the determined number of receive chains may be two receive chains or four receive chains. In some examples, the channel may be configured for LTE communication.

In one example, another apparatus for wireless communication at a wireless communication device is described. The apparatus may include a processor, and memory coupled to the processor. The processor and the memory may be configured to determine a number of receive chains, of a plurality of receive chains, to enable for a channel. The determination may be based at least in part on a transmission scheduling rate for the wireless communication device, a channel quality of the channel, a rank for the channel, or a type of traffic scheduled for the channel. The processor and the memory may also be configured to regulate power to the plurality of receive chains based at least in part on the determined number of receive chains.

In some examples of the apparatus, the processor and the memory may be configured to compare the rank for the channel to a threshold rank, and the determination of the number of receive chains to enable for the channel may be based at least in part on a result of the comparing. In some examples, the determination of the number of receive chains to enable for the channel, based at least in part on the comparing, may include determining to enable at least a predetermined number of the plurality of receive chains when the rank for the channel is higher than the threshold rank. In some examples, the predetermined number of the plurality of receive chains may include all of the plurality of receive chains. In some examples, the comparing may be performed after expiration of a time period following a prior determination of a number of receive chains to enable for the channel. In some examples, the rank for the channel may be based at least in part on: a scheduled rank for the channel, or a reported rank for the channel, or a combination thereof.

In one example, a computer-readable medium for storing instructions executable by a processor at a wireless communication device is described. The instructions may include instructions to determine a number of receive chains, of a plurality of receive chains, to enable for a channel. The determination may be based at least in part on a transmission scheduling rate for the wireless communication device, a channel quality of the channel, a rank for the channel, or a type of traffic scheduled for the channel. The instructions may also include instructions to regulate power to the plurality of receive chains based at least in part on the determined number of receive chains.

In one example, another method for wireless communication at a wireless communication device is described. The method may include comparing a channel quality of a channel to a channel quality threshold; determining a number of receive chains, of a plurality of receive chains, to enable for the channel; and regulating power to the plurality of receive chains based at least in part on the determined number of receive chains. The determination of the number of receive chains to enable may be based at least in part on a transmission scheduling rate for the wireless communication device and a result of the channel quality comparison.

In some examples, the method may include comparing the transmission scheduling rate to a first transmission scheduling rate threshold for enabling receive chains or a second transmission scheduling rate threshold for disabling receive chains, and determining the number of receive chains to enable for the channel may include determining to disable at least one receive chain of the plurality of receive chains for the channel when the transmission scheduling rate is lower than the second transmission scheduling rate threshold. In some cases, the method may include determining to enable a number of receive chains greater than a number of currently-enabled receive chains for the channel when the transmission scheduling rate for the wireless communication device is higher than the first transmission scheduling rate threshold. In some cases, the method may include comparing a channel quality of the channel to a channel quality threshold, wherein the determining is based at least in part on the comparison. In some examples, the channel quality may include a signal-to-interference and noise ratio (SINR). In some examples, the determination of the number of receive chains to enable for the channel may be further based at least in part on a rank for the channel. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. In some examples, the determined number of receive chains may be two receive chains or four receive chains. In some examples, the channel may be configured for LTE communication.

In one example, another apparatus for wireless communication at a wireless communication device is described. The apparatus may include means for comparing a channel quality of a channel to a channel quality threshold; means for determining a number of receive chains, of a plurality of receive chains, to enable for the channel; and means for regulating power to the plurality of receive chains based at least in part on the determined number of receive chains. The determination of the number of receive chains to enable may be based at least in part on a transmission scheduling rate for the wireless communication device and a result of the channel quality comparison.

In some examples, the apparatus may include means for comparing the transmission scheduling rate to a first transmission scheduling rate threshold for enabling receive chains or a second transmission scheduling rate threshold for disabling receive chains, and the means for determining the number of receive chains to enable for the channel may include means for determining to disable at least one receive chain of the plurality of receive chains for the channel when the transmission scheduling rate is lower than the second transmission scheduling rate threshold. In some cases, the apparatus may include means for determining to enable a number of receive chains greater than a number of currently-enabled receive chains for the channel when the transmission scheduling rate for the wireless communication device is higher than the first transmission scheduling rate threshold. In some examples, the channel quality may include a SINR. In some examples, the means for determining the number of receive chains to enable for the channel may further determine the number of receive chains based at least in part on a rank for the channel. In some examples, the means for regulating power to the plurality of receive chains may include at least one of: means for increasing power to a disabled receive chain included in the number of receive chains enabled for the channel, or means for decreasing power to an enabled receive chain not included in the number of receive chains enabled for the channel, or means for maintaining a power state of an enabled receive chain included in the number of receive chains enabled for the channel, or means for maintaining a power state of a disabled receive chain not included in the number of receive chains enabled for the channel. In some examples, the determined number of receive chains may be two receive chains or four receive chains. In some examples, the channel may be configured for LTE communication.

In one example, another apparatus for wireless communication at a wireless communication device is described. The apparatus may include a processor, and memory coupled to the processor. The processor and the memory may be configured to compare a channel quality of a channel to a channel quality threshold; to determine a number of receive chains, of a plurality of receive chains, to enable for the channel; and to regulate power to the plurality of receive chains based at least in part on the determined number of receive chains. The determination of the number of receive chains to enable may be based at least in part on a transmission scheduling rate for the wireless communication device and a result of the channel quality comparison.

In some examples of the apparatus, the processor and the memory may be configured to compare the transmission scheduling rate to a first transmission scheduling rate threshold for enabling receive chains or a second transmission scheduling rate threshold for disabling receive chains, and determining the number of receive chains to enable for the channel may include determining to disable at least one receive chain of the plurality of receive chains for the channel when the transmission scheduling rate is lower than the second transmission scheduling rate threshold. In some cases, the processor and the memory may be configured to determine to enable a number of receive chains greater than a number of currently-enabled receive chains for the channel when the transmission scheduling rate for the wireless communication device is higher than the first transmission scheduling rate threshold. In some examples, the channel quality may include a SINR. In some examples, the determination of the number of receive chains to enable for the channel may be further based at least in part on a rank for the channel.

In one example, another computer-readable medium for storing instructions executable by a processor at a wireless communication device is described. The instructions may include instructions to compare a channel quality of a channel to a channel quality threshold; instructions to determine a number of receive chains, of a plurality of receive chains, to enable for the channel; and instructions to regulate power to the plurality of receive chains based at least in part on the determined number of receive chains. The determination of the number of receive chains to enable may be based at least in part on a transmission scheduling rate for the wireless communication device and a result of the channel quality comparison.

In one example, another method for wireless communication at a wireless communication device is described. The method may include determining a transmission scheduling rate for the wireless communication device during a time period. The transmission scheduling rate may be based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The method may also include determining a number of receive chains, of a plurality of receive chains, to enable for the channel; and regulating power to the plurality of receive chains based at least in part on the determined number of receive chains. The determination of the number of receive chains may be based at least in part on the transmission scheduling rate.

In some examples of the method, determining the number of receive chains to enable for the channel may include determining to enable a number of receive chains greater than a number of currently-enabled receive chains for the channel when the transmission scheduling rate for the wireless communication device is higher than the first transmission scheduling rate threshold. In some cases, determining the number of receive chains to enable for the channel may include determining to disable at least one receive chain of the plurality of receive chains when the transmission scheduling rate for the wireless communication device is lower than the second transmission scheduling rate threshold. In some examples, the method may include comparing the transmission scheduling rate for the wireless communication device to a transmission scheduling rate threshold after a predetermined count of TTIs in the time period. In some examples, the predetermined count of TTIs may be based at least in part on the type of traffic scheduled for the channel during the time period. In some examples, the predetermined count of TTIs may not include TTIs transmitted while the wireless communication device is in a sleep state.

In some examples of the method, the determination of the number of receive chains to enable for the channel may be further based at least in part on: a channel quality of the channel, or a rank for the channel, or a combination thereof. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. In some examples, the determined number of receive chains may be two receive chains or four receive chains. In some examples, the channel may be configured for LTE communication.

In some examples, another apparatus for wireless communication is described. The apparatus may include means for determining a transmission scheduling rate for the wireless communication device during a time period. The transmission scheduling rate may be based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The apparatus may also include means for determining a number of receive chains, of a plurality of receive chains, to enable for the channel; and means for regulating power to the plurality of receive chains based at least in part on the determined number of receive chains. The determination of the number of receive chains may be based at least in part on the transmission scheduling rate.

In some examples of the apparatus, the means for determining the number of receive chains to enable for the channel may include means for determining to enable a number of receive chains greater than a number of currently-enabled receive chains for the channel when the transmission scheduling rate for the wireless communication device is higher than the transmission scheduling rate threshold. In some examples, the method may include means for comparing the transmission scheduling rate for the wireless communication device to a transmission scheduling rate threshold after a predetermined count of TTIs in the time period. In some examples, the predetermined count of TTIs may be based at least in part on the type of traffic scheduled for the channel during the time period. In some examples, the predetermined count of TTIs may not include TTIs transmitted while the wireless communication device is in a sleep state.

In some examples of the apparatus, the means for determining the number of receive chains to enable for the channel may further determine the number of receive chains to enable based at least in part on: a channel quality of the channel, or a rank for the channel, or a combination thereof. In some examples, the means for regulating power to the plurality of receive chains may include at least one of: means for increasing power to a disabled receive chain included in the number of receive chains enabled for the channel, or means for decreasing power to an enabled receive chain not included in the number of receive chains enabled for the channel, or means for maintaining a power state of an enabled receive chain included in the number of receive chains enabled for the channel, or means for maintaining a power state of a disabled receive chain not included in the number of receive chains enabled for the channel. In some examples, the determined number of receive chains may be two receive chains or four receive chains. In some examples, the channel may be configured for LTE communication.

In one example, another apparatus for wireless communication at a wireless communication device is described. The apparatus may include a processor, and memory coupled to the processor. The processor and the memory may be configured to determine a transmission scheduling rate for the wireless communication device during a time period, the transmission scheduling rate based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The processor and the memory may also be configured to determine a number of receive chains, of a plurality of receive chains, to enable for the channel; and to regulate power to the plurality of receive chains based at least in part on the determined number of receive chains. The determination of the number of receive chains may be based at least in part on the transmission scheduling rate.

In some examples of the apparatus, determining the number of receive chains to enable for the channel may include determining to enable a number of receive chains greater than a number of currently-enabled receive chains for the channel when the transmission scheduling rate for the wireless communication device is higher than the transmission scheduling rate threshold. In some examples, the processor and the memory may be configured to compare the transmission scheduling rate for the wireless communication device to a transmission scheduling rate threshold after a predetermined count of TTIs in the time period. In some examples, the predetermined count of TTIs may be based at least in part on the type of traffic scheduled for the channel during the time period. In some examples, the predetermined count of TTIs may not include TTIs transmitted while the wireless communication device is in a sleep state.

In one example, another computer-readable medium for storing instructions executable by a processor at a wireless communication device is described. The instructions may include instructions to determine a transmission scheduling rate for the wireless communication device during a time period. The transmission scheduling rate may be based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The instructions may also include instructions to determine a number of receive chains, of a plurality of receive chains, to enable for the channel; and instructions to regulate power to the plurality of receive chains based at least in part on the determined number of receive chains. The determination of the number of receive chains to enable may be based at least in part on the transmission scheduling rate.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for determining a number of receive chains to enable for a channel. In various examples, the number of receive chains to be enabled for a channel may be determined based on parameters such as a transmission scheduling rate for a wireless communication device, a channel quality of a channel, a rank of the channel, and/or a type of traffic scheduled for the channel. In some examples, a first subset of receive chains may support lower order receive diversity for a wireless communication device, and a second subset of receive chains (e.g., in combination with the first subset of receive chains) may provide HORxD for the wireless communication device. In some examples, the second subset of receive chains may be adaptively enabled or disabled using some of the described techniques. In other examples, individual receive chains may be adaptively enabled or disabled using some of the described techniques.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
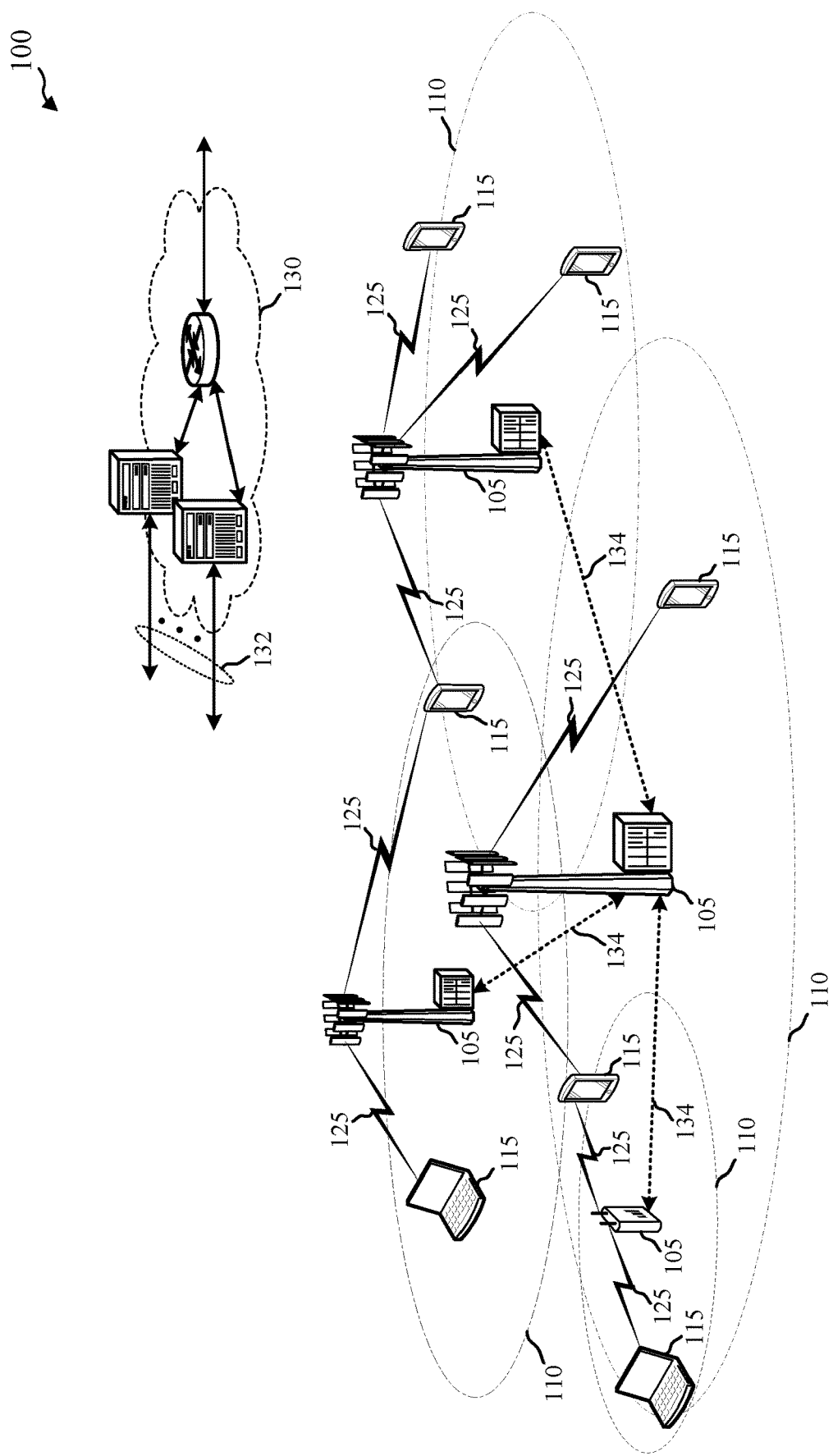
FIG. 1 shows an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-Advanced (LTE-A) network. In LTE/LTE-A networks, the term eNB may be used to describe a base station 105, while the term UE may be used to describe a UE 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic coverage area 110 (e.g., several kilometers in radius) and may allow unrestricted access by UEs 115 with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs 115 with service subscriptions with the network provider. A femto cell also may cover a relatively small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the radio resource control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations 105 and network equipment, including macro eNBs, small cell eNBs, relay base stations, and the like.

The communication links 125 shown in wireless communication system 100 may include downlinks from a base station 105 to a UE 115, or uplinks from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 and/or UEs 115 may include multiple antennas for employing antenna diversity schemes. Antenna diversity schemes may improve communication quality and reliability between base stations 105 and UEs 115. Additionally or alternatively, base stations 105 or UEs 115 may employ MIMO communication techniques that may take advantage of multi-path environments to transmit multiple spatial layers carrying the same or different coded data. In some examples, MIMO communication techniques may be used under certain conditions. When MIMO communication techniques are not used, or when MIMO communication techniques of lower order are used, one or more receive chains associated with HORxD may be disabled.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

Figure 2:
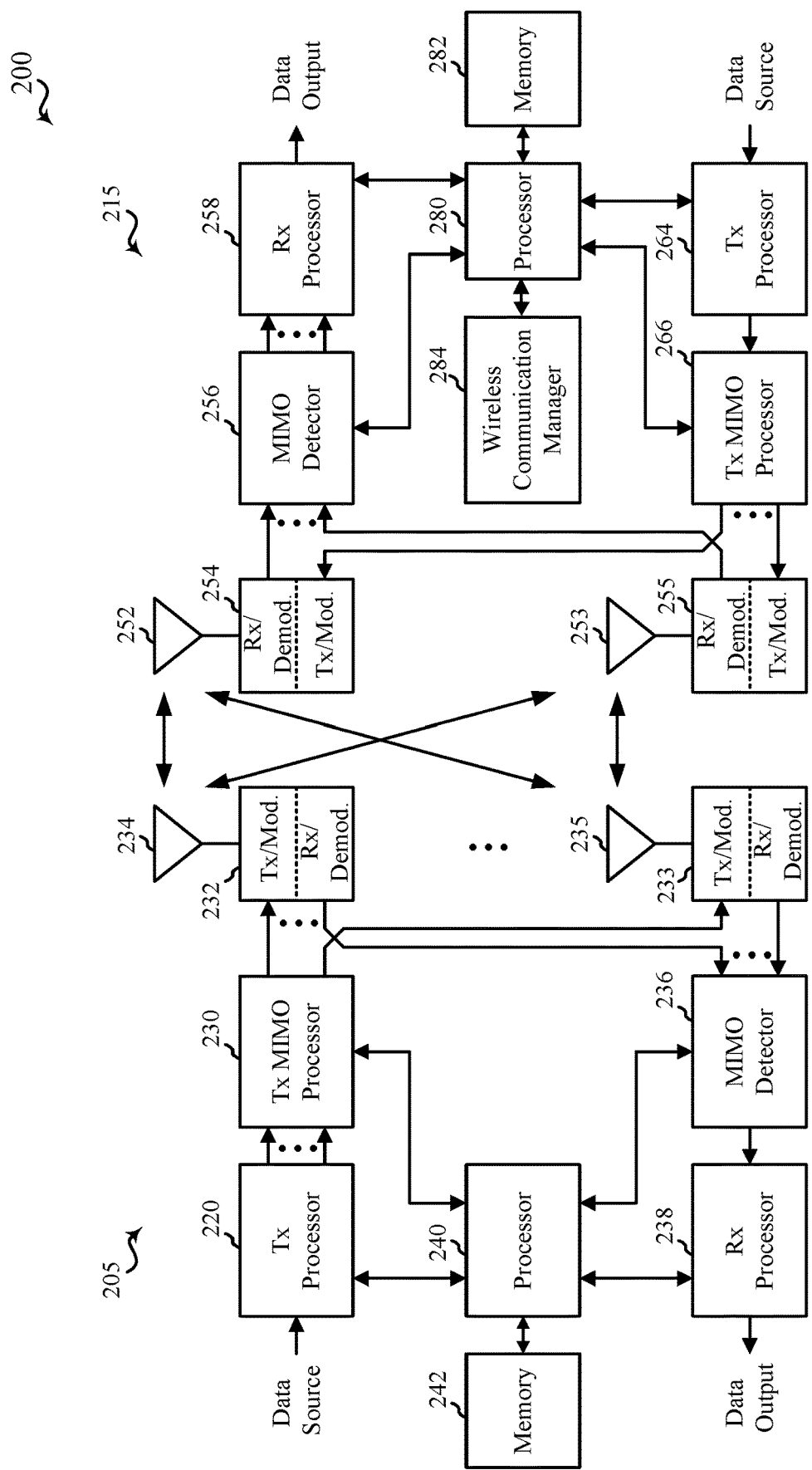
FIG. 2 is a block diagram of a MIMO communication system including a base station and a UE, in accordance with various aspects of the present disclosure.

FIG. 2 is a block diagram of a MIMO communication system 200 including a base station 205 and a UE 215, in accordance with various aspects of the present disclosure. The MIMO communication system 200 may be an example of aspects of the wireless communication system 100 described with reference to FIG. 1. The base station 205 may be equipped with M antennas numbered 234 through 235, and the UE 215 may be equipped with N antennas numbered 252 through 253. In the MIMO communication system 200, the base station 205 may be able to send data over multiple communication links of a channel at the same time. Each communication link may be called a "layer" and the "rank" of the communication link may indicate the number of layers used for communication. For example, in a 2×2 MIMO communication system where base station 205 transmits (e.g., and UE 215 receives) two "layers" on the channel, the rank of the communication link between the base station 205 and the UE 215 may be two.

At the base station 205, a transmit (Tx) processor 220 may receive data from a data source. The transmit processor 220 may process the data. The transmit processor 220 may also generate control symbols and/or reference symbols. A transmit MIMO processor 230 may perform spatial processing (e.g., precoding) on data symbols, control symbols, and/or reference symbols, if applicable, and may provide output symbol streams to transmit chains including one or more of the modulators 232 through 233. Each modulator 232 through 233 may process a respective output symbol stream (e.g., for OFDM, etc.) to obtain an output sample stream. Each modulator 232 through 233 may further process (e.g., convert to analog, amplify, filter, and upconvert) the output sample stream to obtain a downlink signal. In one example, downlink signals from one or more of modulators 232 through 233 may be transmitted via one or more of the M antennas 234 through 235.

At the UE 215, one or more of the N antennas 252 through 253 may receive the downlink signals from the base station 205 and provide the received signals to one or more receive chains including one or more of the demodulators 254 through 255. Each demodulator 254 through 255 may condition (e.g., filter, amplify, downconvert, and digitize) a respective received signal to obtain input samples. Each demodulator 254 through 255 may further process the input samples (e.g., for OFDM, etc.) to obtain received symbols. A MIMO detector 256 may obtain received symbols from one or more of the demodulators 254 through 255, perform MIMO detection on the received symbols, if applicable, and provide detected symbols. A receive processor 258 may process (e.g., demodulate, deinterleave, and decode) the detected symbols, providing decoded data for the UE 215 to a data output, and providing decoded control information to a processor 280 or memory 282.

The processor 280 may execute stored instructions to instantiate a wireless communication manager 284. The wireless communication manager 284 may be an example of aspects of the wireless communication manager 1120, 1220, or 1350 described with reference to FIGS. 11, 12, and 13, respectively, and may be used to determine a number of receive chains to enable.

On the uplink, at the UE 215, a transmit processor 264 may receive and process data from a data source. The transmit processor 264 may also generate reference symbols for a reference signal. The symbols from the transmit processor 264 may be precoded by a transmit MIMO processor 266 if applicable, further processed by one or more transmit chains including one or more of the modulators 254 through 255 (e.g., for single carrier FDMA (SC-FDMA), etc.), and be transmitted to the base station 205 via one or more of the N antennas 252 through 253, in accordance with the transmission parameters received from the base station 205. At the base station 205, the uplink signals from the UE 215 may be received by one or more of the M antennas 234 through 235, processed by one or more receive chains including one or more of the demodulators 232 through 233, detected by a MIMO detector 236 if applicable, and further processed by a receive processor 238. The receive processor 238 may provide decoded data to a data output and to a processor 240 or memory 242. In aspects of the present example, the terms modulator and demodulator may be used to refer to the same component (e.g., a modem).

The components of the UE 215 may, individually or collectively, be implemented with one or more application-specific integrated circuits (ASICs) adapted to perform some or all of the applicable functions in hardware. Each of the noted components may be a means for performing one or more functions related to operation of the MIMO communication system 200. Similarly, the components of the base station 205 may, individually or collectively, be implemented with one or more ASICs adapted to perform some or all of the applicable functions in hardware. Each of the noted components may be a means for performing one or more functions related to operation of the MIMO communication system 200.

In some examples of the MIMO communication system 200, the UE 215 may adaptively enable or disable HORxD. In some examples, enabling HORxD may include enabling a total of four receive chains (or all receive chains) of the UE 215. In some examples, disabling HORxD may include enabling just two receive chains (or a subset of receive chains) of the UE 215. In scenarios in which the UE 215 employs CA, HORxD may be used for a carrier to which enough antennas have been allocated to enable HORxD. Aspects of the present disclosure are described with HORxD corresponding to four receive chains and non-HORxD corresponding to two receive chains; however, other numbers of receive chains are also considered.

HORxD may be enabled (e.g., four receive chains may be enabled), for example, when a transmission scheduling rate associated with the channel between the base station 205 and the UE 215 is higher than a threshold. For example, HORxD may be enabled when PDSCH_SCHED_RATE>$S_{th,2}$, where PDSCH_SCHED_RATE is a physical downlink shared channel (PDSCH) scheduling rate and $S_{th,2}$ is a transmission scheduling rate threshold. HORxD may also be enabled, for example, when a channel quality (e.g., a SINR) of the channel is non-satisfactory or low. For example, HORxD may be enabled when a low SINR state exists (e.g., when $\min(RS\_SINR_0, RS\_SINR_1)<SINR_{low}$, where $SINR_0$ is a SINR for a receive chain 0 that remains powered regardless of whether HORxD is enabled, $SINR_1$ is a SINR for a receive chain 1 that remains powered regardless of whether HORxD is enabled, and $SINR_{low}$ is a non-satisfactory (e.g., low) channel quality threshold). Thus, in some examples, HORxD may be independently enabled (or disabled) based on a transmission scheduling rate or a channel quality.

HORxD may be disabled (e.g., just two receive chains may be enabled), for example, when a transmission scheduling rate associated with the channel between the base station 205 and the UE 215 is lower than a threshold and a channel quality (e.g., a SINR) of the channel is satisfactory or high. For example, HORxD may be disabled when PDSCH_SCHED_RATE<$S_{th,1}$ and min(RS_SINR$_0$, RS_SINR$_1$)>SINR$_{high}$, where $S_{th,1}$ is a transmission scheduling rate threshold and SINR$_{high}$ is a satisfactory (e.g., high) channel quality threshold. Thus, in some examples, HORxD may be disabled based on a combination of transmission scheduling rate and channel quality determinations.

A transmission scheduling rate (e.g., PDSCH_SCHED_RATE) may be determined (e.g., calculated) for a time period. In some examples, the time period may vary based at least in part on whether HORxD is enabled or disabled. For example, the time period may be 160 milliseconds (ms) when HORxD is enabled and 10 ms when HORxD is disabled. In some examples, $S_{th,1}$ and $S_{th,2}$ may be equal. In other examples, $S_{th,1}$ and $S_{th,2}$ may differ (e.g., with $S_{th,1}<S_{th,2}$). In some examples, SINR$_{low}$ and SINR$_{high}$ may be equal. In other examples, SINR$_{low}$ and SINR$_{high}$ may differ (e.g., with SINR$_{low}<$SINR$_{high}$). Values of PDSCH_SCHED_RATE, RS_SINR$_0$, and SINR$_1$ may be, in some examples, periodically measured or otherwise determined by the UE 215.

In some examples, a transmission scheduling rate may be determined based on all transmitted TTIs. In other examples, a transmission scheduling rate may be based on just some transmitted subframes, such as just subframes transmitted while the UE 215 is awake. A TTI may be a subframe, slot, symbol, etc. Although the present disclosure often refers to determinations made for time periods including a number of subframes, the determinations may be made in a similar manner for time periods including other types of TTIs.

In some examples, a transmission scheduling rate may be determined in different ways, depending on a type of traffic (e.g., LTE/LTE-A, Voice-over-LTE (VoLTE), etc.) scheduled during a time period for which the transmission scheduling rate is determined. For example, when LTE/LTE-A or other non-VoLTE traffic is transmitted during a time period for which a transmission scheduling rate is determined, subframes transmitted while the UE 215 is awake (e.g., subframes including transmissions to the UE 215, connected state discontinuous reception mode (CDRX) ON subframes, inactive subframes, retransmission (retx) subframes, etc.) may be counted as part of the time period for which the transmission scheduling rate is determined, but subframes transmitted while the UE 215 is in a sleep state (and/or gap subframes (e.g., CDRX OFF subframes)) may not be counted as part of the time period for which the transmission scheduling rate is determined. As another example, when VoLTE traffic is transmitted during a time period for which a transmission scheduling rate is determined, subframes transmitted while the UE 215 is awake or in a sleep state may be counted as part of the time period for which the transmission scheduling rate is determined.

In some examples, HORxD may also or alternatively be enabled or disabled based on a rank (e.g., a demodulation rank) of the channel between the base station 205 and the UE 215. For example, HORxD may be enabled upon the UE 215's receipt of a scheduled rank (e.g., a rank of a transmission scheduled by the base station 205) greater than a rank threshold (e.g., a rank greater than 2, such as a rank of 3 or 4). HORxD may also or alternatively be enabled, for example, prior to receiving a subframe corresponding to a scheduled rank greater than the rank threshold.

In some examples, HORxD may be enabled or disabled based on a combination of a rank of the channel between the base station 205 and the UE 215 and a transmission scheduling rate. For example, the transmission scheduling rate may be the driving factor in determining to enable HORxD while the rank of the channel may be the driving factor in determining to disable HORxD. As illustrated by this and other examples described herein, asymmetric criterion for determining to enable or disable HORxD may exist (e.g., such that a UE 215 may consider different criteria to enable HORxD than it considers to disable HORxD). In some examples, considering different criteria may refer to weighting the same criteria differently (e.g., such that transmission scheduling rate may be weighted more heavily in order to determine whether to enable HORxD).

Figure 3:
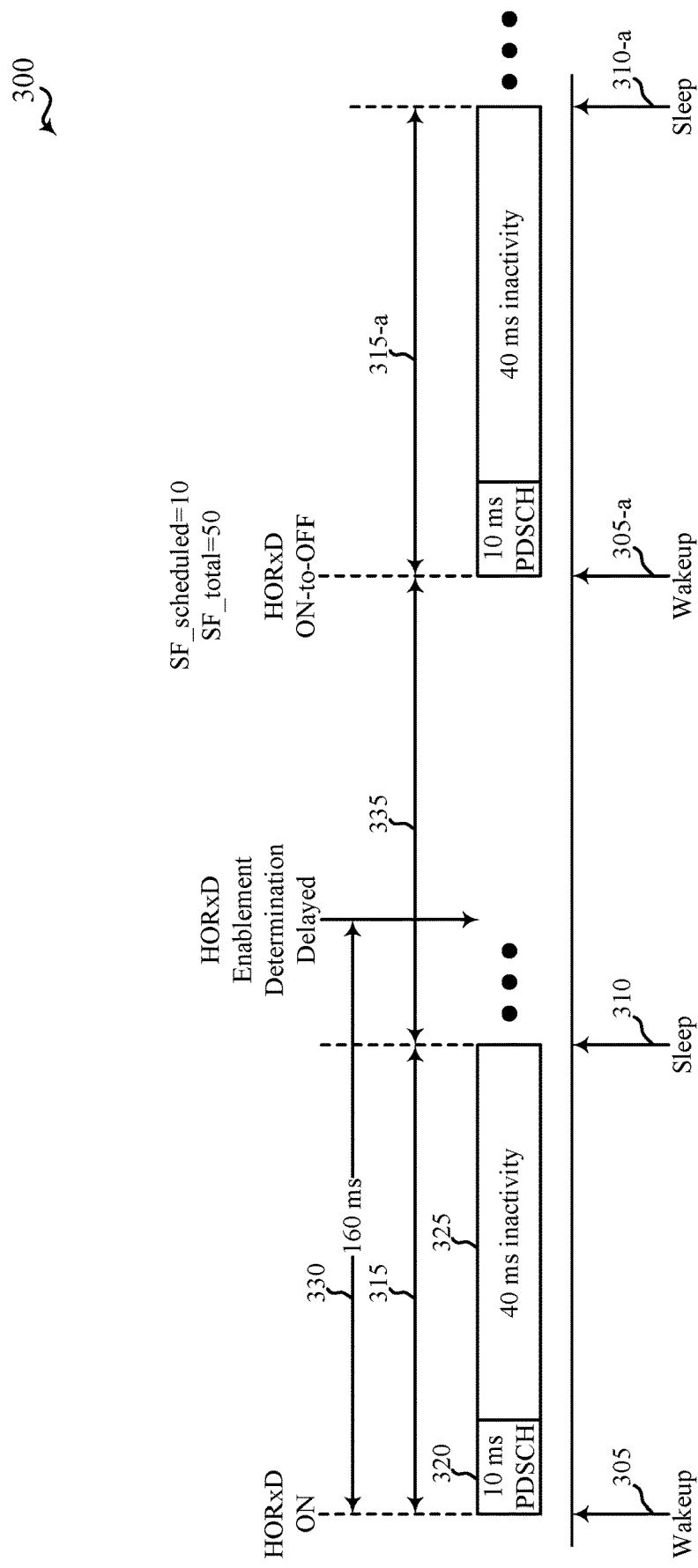
FIG. 3 shows a timeline of transmissions on a channel between a base station and a UE, in accordance with various aspects of the present disclosure.

FIG. 3 shows a timeline 300 of transmissions on a channel between a base station and a UE, in accordance with various aspects of the present disclosure. In some examples, the base station and UE may be examples of the corresponding devices described with reference to FIG. 1 or 2. Aspects of the following examples are described with reference to subframes, though it is to be understood that any suitable time segmentation (e.g., TTI, shortened TTI (sTTI), slot, frame, etc.) may be employed without deviating from the scope of the present disclosure.

By way of example, the timeline 300 indicates that the UE is awake between a first wakeup time 305 and a first sleep time 310, and between a second wakeup time 305-a and a second sleep time 310-a. During each of these awake periods (e.g., a first awake period 315 and a second awake period 315-a), and by way of example, the UE may receive a transmission (e.g., a PDSCH) during a first number of subframes (e.g., during a 10 ms PDSCH reception period 320) and not receive a transmission (e.g., have a period of inactivity) during a second number of subframes (e.g., during a 40 ms period of inactivity 325). In other examples, the UE may receive a transmission or have a period of inactivity in more or fewer subframes. The UE may also receive a transmission over an entire awake period, or may have a period of inactivity for an entire awake period. During a period of inactivity, the UE may monitor the channel for a transmission directed to the UE.

At the beginning of the first awake period 315, and by way of example, HORxD may be enabled (or ON) at the UE, and the UE may begin counting subframes within a transmission scheduling rate determination time period 330. By way of example, the transmission scheduling rate determination time period 330 is shown to be 160 ms (or 160 subframes) and extend into a time period 335 when the UE is in a sleep state. A HORxD enablement/disablement determination may therefore be delayed until a next awake period (e.g., until the second awake period 315-a). In other examples, a HORxD enablement/disablement determination may not be delayed. At the start of the second awake period 315-a, the number of subframes in which the UE was awake during the transmission scheduling rate determination time period 330 is 50 (e.g., SF_total=50), and the number of subframes in which the UE received a transmission during the transmission scheduling rate determination time period 330 is 10 (e.g., SF_scheduled=10). From these values, a transmission scheduling rate may be determined (e.g., transmission scheduling rate=10/50=20%). Assuming the transmission scheduling rate does not exceed a threshold (e.g., $S_{th,1}$) and a channel quality of the channel is high, HORxD may be disabled (transitioned ON-to-OFF) during the second awake period 315-a. An additional transmission scheduling rate determination time period (not shown) may commence at wakeup time 305-a.

Figure 4:
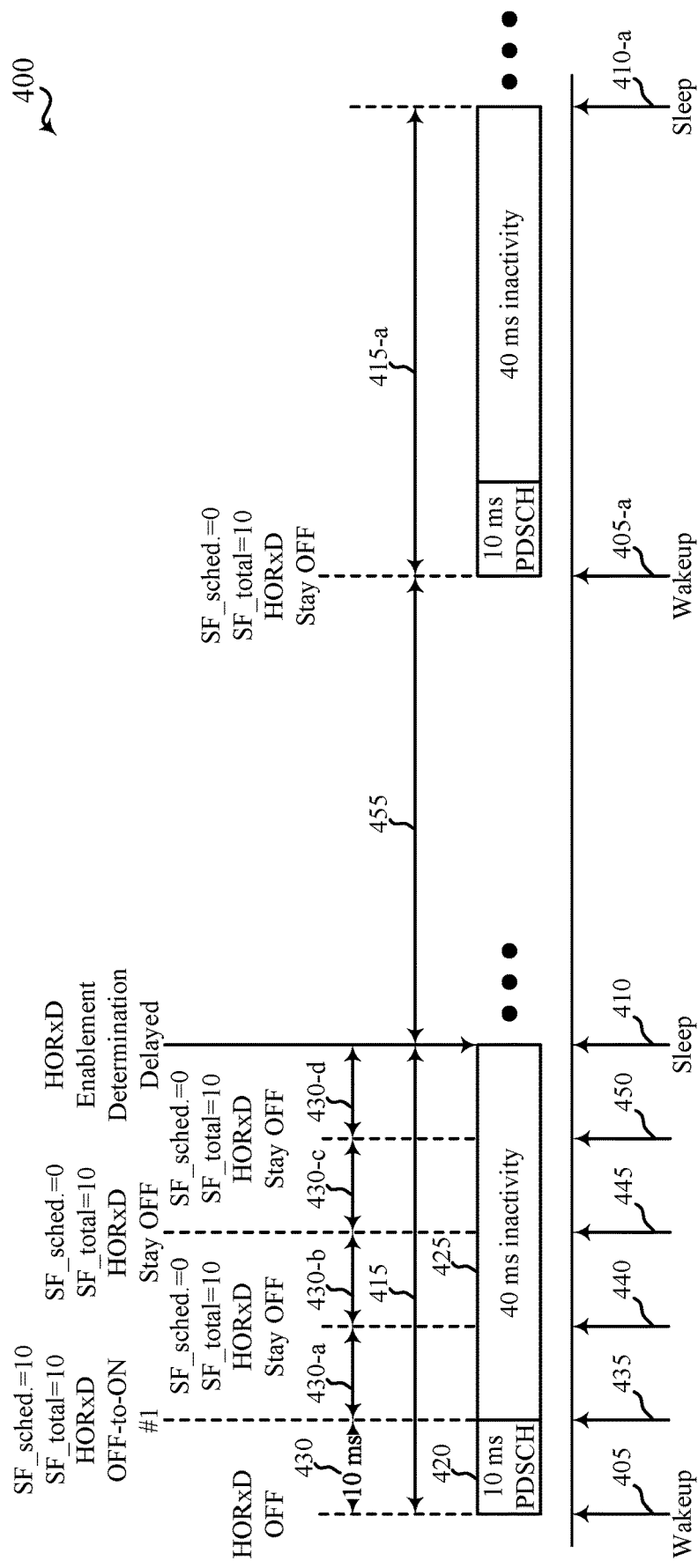
FIG. 4 shows a timeline of transmissions on a channel between a base station and a UE, in accordance with various aspects of the present disclosure.

FIG. 4 shows a timeline 400 of transmissions on a channel between a base station and a UE, in accordance with various aspects of the present disclosure. In some examples, the base station and UE may be examples of the corresponding devices described with reference to FIG. 1 or 2.

By way of example, the timeline 400 indicates that the UE is awake between a first wakeup time 405 and a first sleep time 410, and between a second wakeup time 405-a and a second sleep time 410-a. During each of these awake periods (e.g., a first awake period 415 and a second awake period 415-a), and by way of example, the UE may receive a transmission (e.g., a PDSCH) during a first number of subframes (e.g., during a 10 ms PDSCH reception period 420) and not receive a transmission (e.g., have a period of inactivity) during a second number of subframes (e.g., during a 40 ms period of inactivity 425). In other examples, the UE may receive a transmission or have a period of inactivity in more or fewer subframes. The UE may also receive a transmission over an entire awake period, or may have a period of inactivity for an entire awake period. During a period of inactivity, the UE may monitor the channel for a transmission directed to the UE.

At the beginning of the first awake period 415, and by way of example, HORxD may be disabled (or OFF) at the UE, and the UE may begin counting subframes within a first transmission scheduling rate determination time period 430. By way of example, the first transmission scheduling rate determination time period 430 is shown to be 10 ms (or 10 subframes). At the end of the first transmission scheduling rate determination time period 430, the number of subframes in which the UE was awake during the first transmission scheduling rate determination time period 430 is 10 (e.g., SF_total=10), and the number of subframes in which the UE received a transmission during the first transmission scheduling rate determination time period 430 is 10 (e.g., SF_scheduled=10). From these values, a first transmission scheduling rate may be determined (e.g., first transmission scheduling rate=10/10=100%). Assuming the first transmission scheduling rate exceeds a threshold (e.g., $S_{th,2}$), a determination to enable HORxD (e.g., turn HORxD from OFF-to-ON) may be made at time 435. However, before resources are allocated and power is consumed for HORxD enablement, the determination to enable HORxD may be confirmed. To perform the confirmation, the UE may begin counting subframes within a second transmission scheduling rate determination time period 430-a commencing at time 435.

By way of example, the second transmission scheduling rate determination time period 430-a is shown to be 10 ms (or 10 subframes). At the end of the second transmission scheduling rate determination time period 430-a, the number of subframes in which the UE was awake during the second transmission scheduling rate determination time period 430-a is 10 (e.g., SF_total=10), and the number of subframes in which the UE received a transmission during the second transmission scheduling rate determination time period 430-a is 0 (e.g., SF_scheduled=0). From these values, a second transmission scheduling rate may be determined (e.g., second transmission scheduling rate=0/10=0%). Assuming the second transmission scheduling rate does not exceed a threshold (e.g., $S_{th,1}$) and a channel quality of the channel is high, the determination made at time 435 may not be confirmed, and HORxD may remain disabled (e.g., stay OFF) at time 440. A third transmission scheduling rate determination time period 430-b may commence at time 440.

By way of example, the third transmission scheduling rate determination time period 430-b is shown to be 10 ms (or 10 subframes). At the end of the third transmission scheduling rate determination time period 430-b, the number of subframes in which the UE was awake during the third transmission scheduling rate determination time period 430-b is 10 (e.g., SF_total=10), and the number of subframes in which the UE received a transmission during the third transmission scheduling rate determination time period 430-b is 0 (e.g., SF_scheduled=0). From these values, a third transmission scheduling rate may be determined (e.g., third transmission scheduling rate=0/10=0%). Assuming the third transmission scheduling rate does not exceed a threshold (e.g., $S_{th,1}$) and a channel quality of the channel is high, HORxD may remain disabled (e.g., stay OFF) at time 445. A fourth transmission scheduling rate determination time period 430-c may commence at time 445.

By way of example, the fourth transmission scheduling rate determination time period 430-c is shown to be 10 ms (or 10 subframes). At the end of the fourth transmission scheduling rate determination time period 430-c, the number of subframes in which the UE was awake during the fourth transmission scheduling rate determination time period 430-c is 10 (e.g., SF_total=10), and the number of subframes in which the UE received a transmission during the fourth transmission scheduling rate determination time period 430-c is 0 (e.g., SF_scheduled=0). From these values, a fourth transmission scheduling rate may be determined (e.g., fourth transmission scheduling rate=0/10=0%). Assuming the fourth transmission scheduling rate does not exceed a threshold (e.g., $S_{th,1}$) and a channel quality of the channel is high, HORxD may remain disabled (e.g., stay OFF) at time 450. A fifth transmission scheduling rate determination time period 430-d may commence at time 450.

By way of example, the fifth transmission scheduling rate determination time period 430-d is shown to be 10 ms (or 10 subframes) and extend to a time period 455 when the UE is in a sleep state. A HORxD enablement/disablement determination may therefore be delayed until a next awake period (e.g., until the second awake period 415-a). In other examples, a HORxD enablement/disablement determination may not be delayed. At the start of the second awake period 415-a, the number of subframes in which the UE was awake during the fifth transmission scheduling rate determination time period 430-d is 10 (e.g., SF_total=10), and the number of subframes in which the UE received a transmission during the fifth transmission scheduling rate determination time period 430-d is −0 (e.g., SF_scheduled=0). From these values, a fifth transmission scheduling rate may be determined (e.g., fifth transmission scheduling rate=0/10=0%). Assuming the fifth transmission scheduling rate does not exceed a threshold (e.g., $S_{th,1}$) and a channel quality of the channel is high, HORxD may remain disabled (e.g., stay OFF) during the second awake period 415-a at time 405-a. A sixth transmission scheduling rate determination time period (not shown) may commence at time 405-a.

Figure 5:
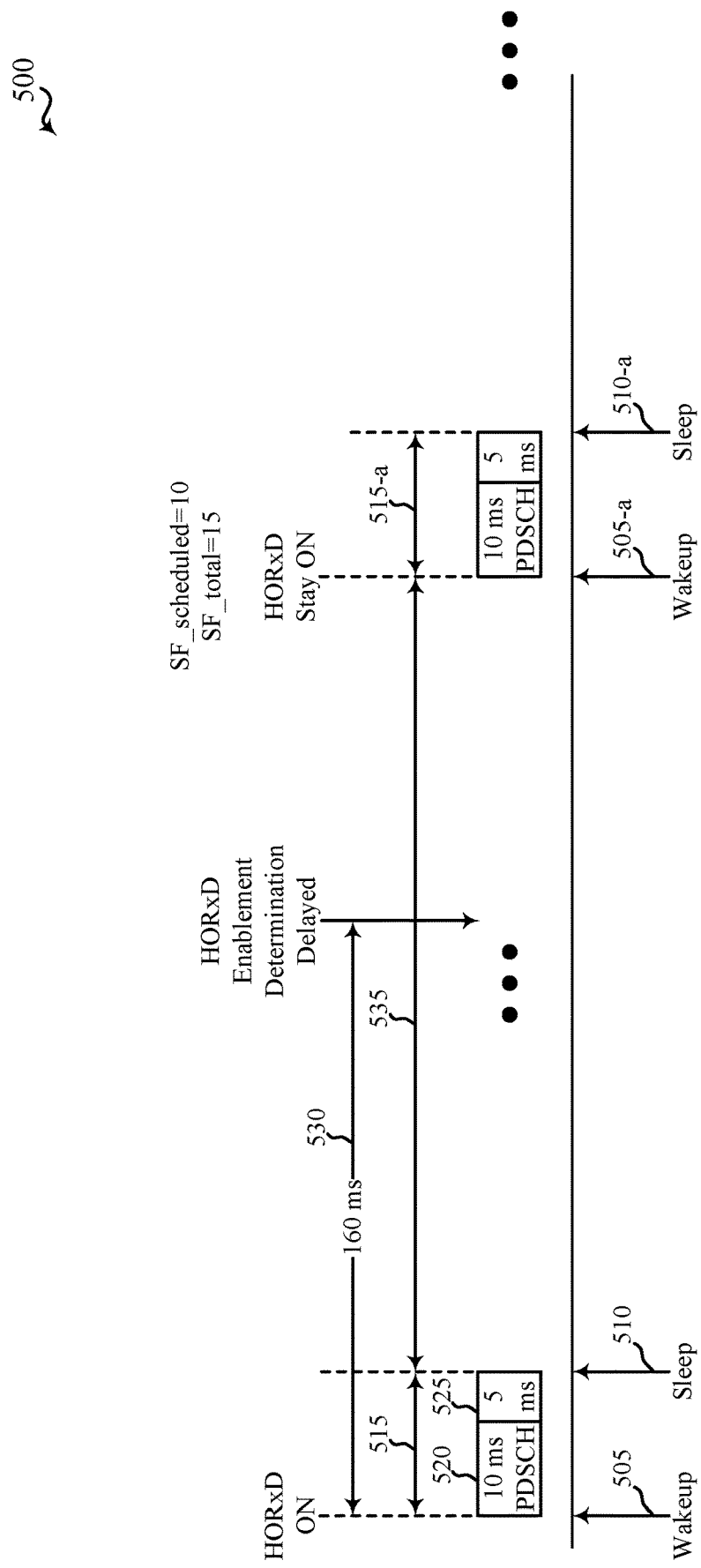
FIG. 5 shows a timeline of transmissions on a channel between a base station and a UE, in accordance with various aspects of the present disclosure.

FIG. 5 shows a timeline 500 of transmissions on a channel between a base station and a UE, in accordance with various aspects of the present disclosure. In some examples, the base station and UE may be examples of the corresponding devices described with reference to FIG. 1 or 2.

By way of example, the timeline 500 indicates that the UE is awake between a first wakeup time 505 and a first sleep time 510, and between a second wakeup time 505-a and a second sleep time 510-*a*. During each of these awake periods (e.g., a first awake period 515 and a second awake period 515-*a*), and by way of example, the UE may receive a transmission (e.g., a PDSCH) during a first number of subframes (e.g., during a 10 ms PDSCH reception period 520) and not receive a transmission (e.g., have a period of inactivity) during a second number of subframes (e.g., during a 5 ms period of inactivity 525). In other examples, the UE may receive a transmission or have a period of inactivity in more or fewer subframes. The UE may also receive a transmission over an entire awake period, or may have a period of inactivity for an entire awake period. During a period of inactivity, the UE may monitor the channel for a transmission directed to the UE.

At the beginning of the first awake period 515, and by way of example, HORxD may be enabled (or ON) at the UE, and the UE may begin counting subframes within a transmission scheduling rate determination time period 530. By way of example, the transmission scheduling rate determination time period 530 is shown to be 160 ms (or 160 subframes) and extend into a time period 535 when the UE is in a sleep state. A HORxD enablement/disablement determination may therefore be delayed until a next awake period (e.g., until the second awake period 515-*a*). In other examples, a HORxD enablement/disablement determination may not be delayed. At the start of the second awake period 515-*a*, the number of subframes in which the UE was awake during the transmission scheduling rate determination time period 530 is 15 (e.g., SF_total=15), and the number of subframes in which the UE received a transmission during the transmission scheduling rate determination time period 530 is 10 (e.g., SF_scheduled=10). From these values, a transmission scheduling rate may be determined (e.g., transmission scheduling rate=10/15 67%). Assuming the transmission scheduling rate exceeds a threshold (e.g., $S_{th,2}$), a determination to maintain HORxD in an enabled state (e.g., stay ON) may be made at time 505-*a*. An additional transmission scheduling rate determination time period (not shown) may commence at time 505-*a*.

Figure 6:
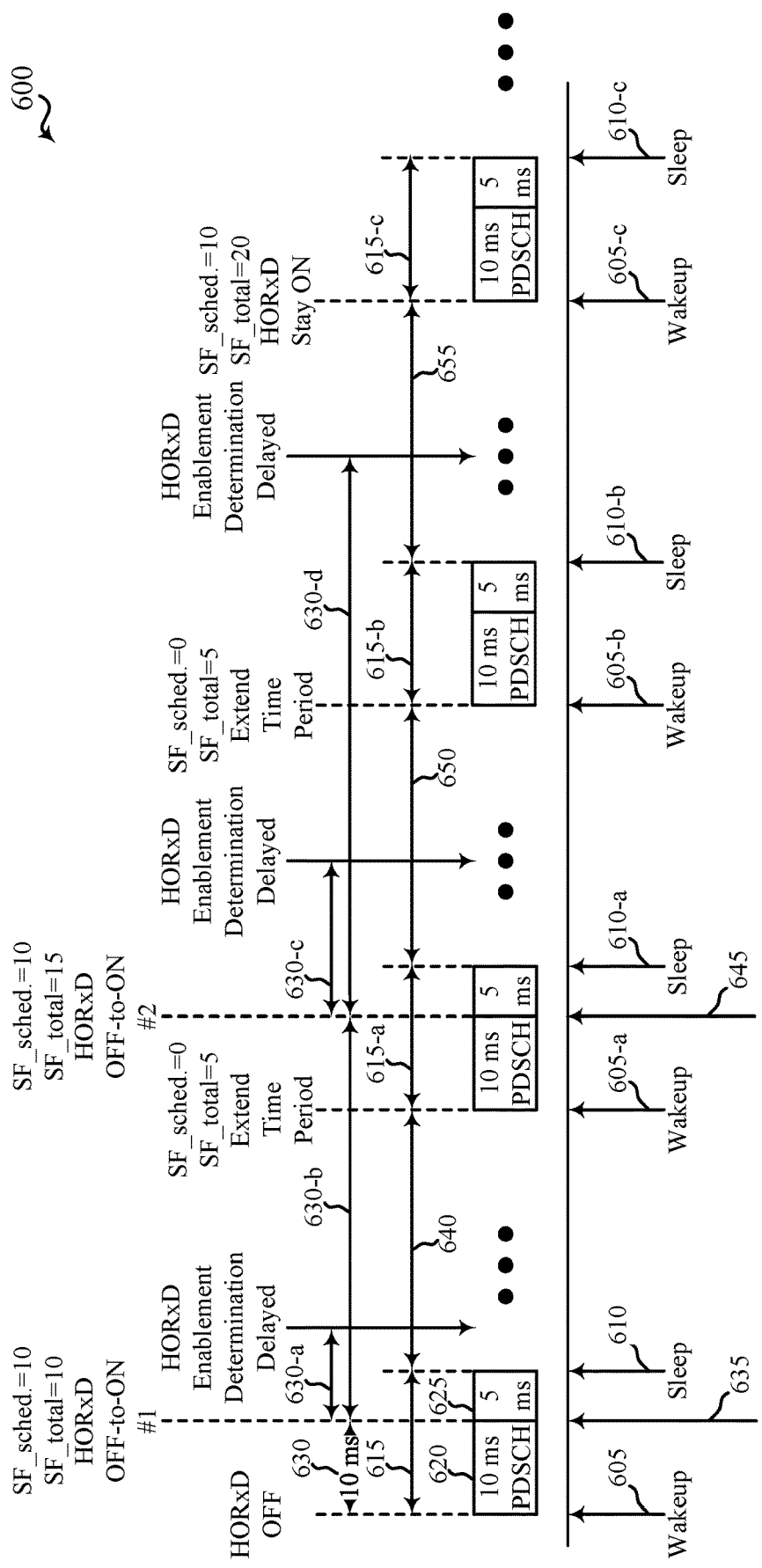
FIG. 6 shows a timeline of transmissions on a channel between a base station and a UE, in accordance with various aspects of the present disclosure.

FIG. 6 shows a timeline 600 of transmissions on a channel between a base station and a UE, in accordance with various aspects of the present disclosure. In some examples, the base station and UE may be examples of the corresponding devices described with reference to FIG. 1 or 2.

By way of example, the timeline 600 indicates that the UE is awake between a first wakeup time 605 and a first sleep time 610, between a second wakeup time 605-*a* and a second sleep time 610-*a*, between a third wakeup time 605-*b* and a third sleep time 610-*b*, and between a fourth wakeup time 605-*c* and a fourth sleep time 610-*c*. During each of these awake periods (e.g., a first awake period 615, a second awake period 615-*a*, a third awake period 615-*b*, and a fourth awake period 615-*c*), and by way of example, the UE may receive a transmission (e.g., a PDSCH) during a first number of subframes (e.g., during a 10 ms PDSCH reception period 620) and not receive a transmission (e.g., have a period of inactivity) during a second number of subframes (e.g., during a 5 ms period of inactivity 625). In other examples, the UE may receive a transmission or have a period of inactivity in more or fewer subframes. The UE may also receive a transmission over an entire awake period, or may have a period of inactivity for an entire awake period. During a period of inactivity, the UE may monitor the channel for a transmission directed to the UE.

At the beginning of the first awake period 615, and by way of example, HORxD may be disabled (or OFF) at the UE, and the UE may begin counting subframes within a first transmission scheduling rate determination time period 630. By way of example, the first transmission scheduling rate determination time period 630 is shown to be 10 ms (or 10 subframes). At the end of the first transmission scheduling rate determination time period 630, the number of subframes in which the UE was awake during the first transmission scheduling rate determination time period 630 is 10 (e.g., SF_total=10), and the number of subframes in which the UE received a transmission during the first transmission scheduling rate determination time period 630 is 10 (e.g., SF_scheduled=10). From these values, a first transmission scheduling rate may be determined (e.g., first transmission scheduling rate=10/10=100%). Assuming the first transmission scheduling rate exceeds a threshold (e.g., $S_{th,2}$), a determination to enable HORxD (e.g., transition HORxD from OFF-to-ON) may be made at time 635. However, before resources are allocated and power is consumed for HORxD enablement, the determination to enable HORxD may be confirmed. To perform the confirmation, the UE may begin counting subframes within a second transmission scheduling rate determination time period 630-*a* commencing at time 635.

By way of example, the second transmission scheduling rate determination time period 630-*a* is shown to be 10 ms (or 10 subframes) and extend into a time period 640 when the UE is in a sleep state. A HORxD enablement/disablement determination may therefore be delayed until a next awake period (e.g., until the second awake period 615-*a*). In other examples, a HORxD enablement/disablement determination may not be delayed. At the end of the second transmission scheduling rate determination time period 630-*a*, the number of subframes in which the UE was awake during the second transmission scheduling rate determination time period 630-*a* is 5 (e.g., SF_total=5), and the number of subframes in which the UE received a transmission during the second transmission scheduling rate determination time period 630-*a* is 0 (e.g., SF_scheduled=0). Because the number of subframes in which the UE was awake during the second transmission scheduling rate determination time period 630-*a* is less than a threshold (e.g., less than 10 subframes), the second transmission scheduling rate determination time period 630-*a* may be considered invalid or be extended. By way of example, FIG. 6 assumes the second transmission scheduling rate determination time period 630-*a* is extended (e.g., for the duration of an additional transmission scheduling rate determination period (e.g., for 10 subframes)).

At the end of the extended second transmission scheduling rate determination time period 630-*b*, the number of subframes in which the UE was awake during the extended second transmission scheduling rate determination time period 630-*b* is 15 (e.g., SF_total=15), and the number of subframes in which the UE received a transmission during the extended second transmission scheduling rate determination time period 630-*b* is 10 (e.g., SF_scheduled=10). From these values, a second transmission scheduling rate may be determined (e.g., second transmission scheduling rate=10/15 67%). Assuming the second transmission scheduling rate exceeds a threshold (e.g., $S_{th,2}$), a second determination to enable HORxD (e.g., transition HORxD from OFF-to-ON) may be made at time 645, thereby confirming the enablement determination made at time 635. HORxD may be enabled at time 645. A third transmission scheduling rate determination time period 630-*c* may commence at time 645.

By way of example, the third transmission scheduling rate determination time period 630-*c* is shown to be 160 ms (or 160 subframes) and extend into a time period 650 when the UE is in a sleep state. A HORxD enablement/disablement determination may therefore be delayed until a next awake period (e.g., until the third awake period 615-b). In other examples, a HORxD enablement/disablement determination may not be delayed. The third transmission scheduling rate determination time period 630-c may differ from the first transmission scheduling rate determination time period 630 and extended second transmission scheduling rate determination time period 630-b because it commences while HORxD is enabled (instead of disabled). At the end of the third transmission scheduling rate determination time period 630-c, the number of subframes in which the UE was awake during the third transmission scheduling rate determination time period 630-c is 5 (e.g., SF_total=5), and the number of subframes in which the UE received a transmission during the third transmission scheduling rate determination time period 630-c is 0 (e.g., SF_scheduled=0). Because the number of subframes in which the UE was awake during the third transmission scheduling rate determination time period 630-c is less than a threshold (e.g., less than 10 subframes), the third transmission scheduling rate determination time period 630-c may be considered invalid or be extended. By way of example, FIG. 6 assumes the third transmission scheduling rate determination time period 630-c is extended (e.g., for the duration of an additional transmission scheduling rate determination period (e.g., for 160 subframes)).

As shown, the extended third transmission scheduling rate determination time period 630-d may extend into a time period 655 when the UE is in a sleep state. A HORxD enablement/disablement determination may therefore be delayed until a next awake period (e.g., until the fourth awake period 615-c). In other examples, a HORxD enablement/disablement determination may not be delayed. At the end of the extended third transmission scheduling rate determination time period 630-d, the number of subframes in which the UE was awake during the extended third transmission scheduling rate determination time period 630-d is 20 (e.g., SF_total=20), and the number of subframes in which the UE received a transmission during the extended third transmission scheduling rate determination time period 630-d is 10 (e.g., SF_scheduled=10). From these values, a transmission scheduling rate may be determined (e.g., third transmission scheduling rate=10/20=50%). Assuming the third transmission scheduling rate exceeds a threshold (e.g., $S_{th,2}$), a determination to enable HORxD may be made at time 660, and HORxD may remain enabled (e.g., stay ON) at time 605-c. A fourth transmission scheduling rate determination time period (not shown) may commence at time 605-c.

Figure 7:
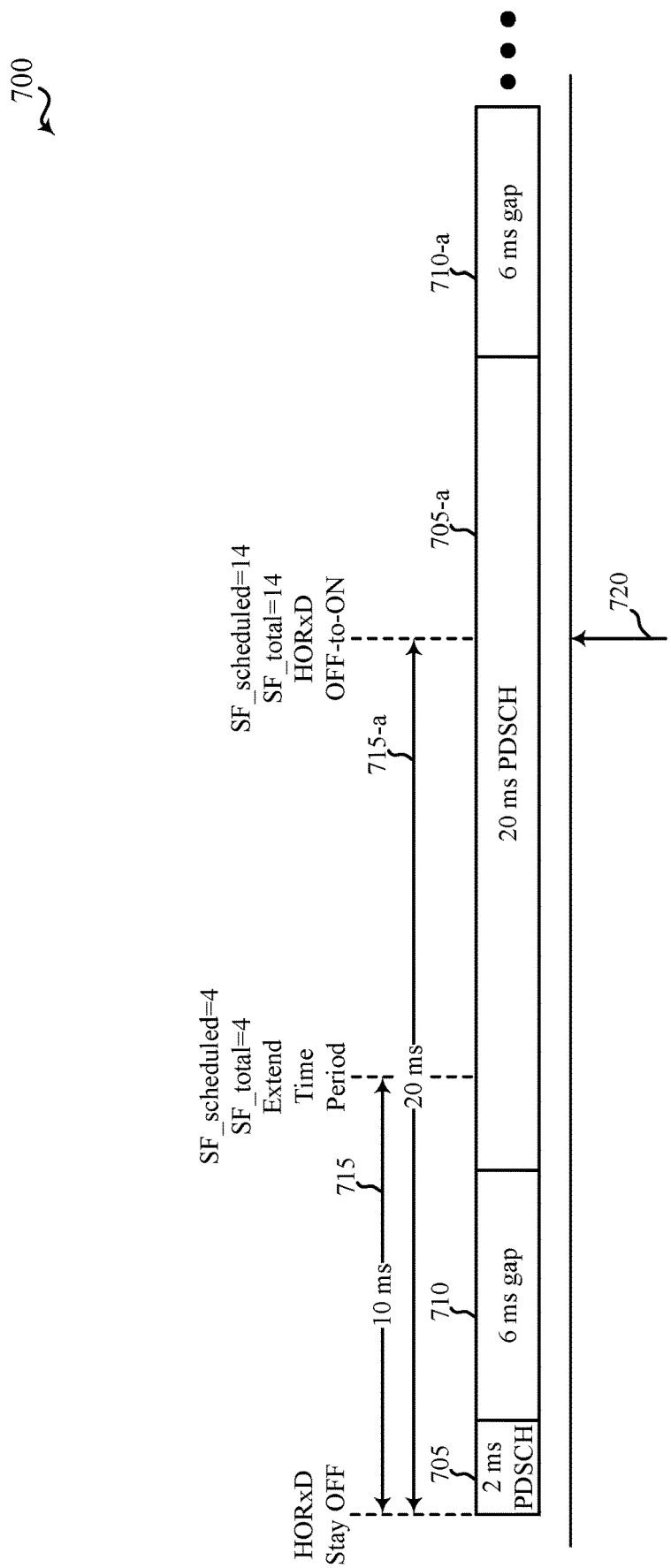
FIG. 7 shows a timeline of transmissions on a channel between a base station and a UE, in accordance with various aspects of the present disclosure.

FIG. 7 shows a timeline 700 of transmissions on a channel between a base station and a UE, in accordance with various aspects of the present disclosure. In some examples, the base station and UE may be examples of the corresponding devices described with reference to FIG. 1 or 2.

By way of example, the timeline 700 indicates that the UE receives transmissions (e.g., PDSCH transmissions) in accordance with a CDRX mode, and receives transmissions during a first time period 705 and a second time period 705-a, but not during a first gap period 710 or a second gap period 710-a. During each of the first time period 705 and the second time period 705-a, and by way of example, the UE may receive a transmission (e.g., a PDSCH) during a number of subframes (e.g., during 2 subframes or 2 ms during the first time period 705, and during 20 subframes or 20 ms during the second time period 705-a).

At the beginning of the first time period 705, and by way of example, HORxD may be disabled (or OFF) at the UE, and the UE may begin counting subframes within a first transmission scheduling rate determination time period 715. By way of example, the first transmission scheduling rate determination time period 715 is shown to be 10 ms (or 10 subframes). At the end of the first transmission scheduling rate determination time period 715, the number of ON subframes received by the UE during the first transmission scheduling rate determination time period 715 is 4 (e.g., SF_total=4, and SF_scheduled=4). Because the number of ON subframes received by the UE during the first transmission scheduling rate determination time period 715 is less than a threshold (e.g., less than 10 subframes), the first transmission scheduling rate determination time period 715 may be considered invalid or be extended. By way of example, FIG. 7 assumes the first transmission scheduling rate determination time period 715 is extended (e.g., for the duration of an additional transmission scheduling rate determination period (e.g., for 10 subframes)).

At the end of the extended first transmission scheduling rate determination time period 715-a, the number of ON subframes received by the UE during the extended first transmission scheduling rate determination time period 715-a is 14 (e.g., SF_total=14, and SF_scheduled=14). From these values, a transmission scheduling rate may be determined (e.g., transmission scheduling rate=14/14=100%). Assuming the transmission scheduling rate exceeds a threshold (e.g., $S_{th,2}$), a determination to enable HORxD (e.g., transition HORxD from OFF-to-ON) may be made at time 720, and HORxD may be enabled at time 720. A second transmission scheduling rate determination time period (not shown) may commence at time 720.

Figure 8:
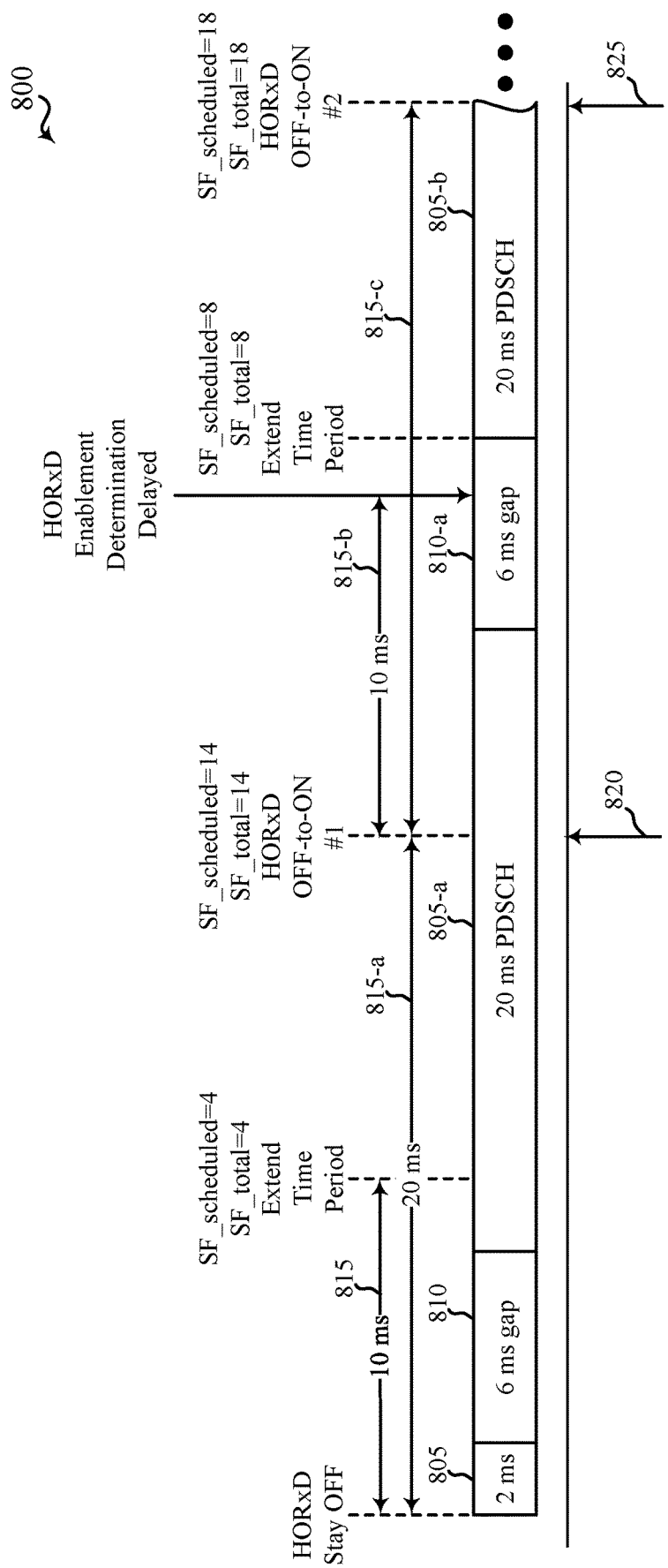
FIG. 8 shows a timeline of transmissions on a channel between a base station and a UE, in accordance with various aspects of the present disclosure.

FIG. 8 shows a timeline 800 of transmissions on a channel between a base station and a UE, in accordance with various aspects of the present disclosure. In some examples, the base station and UE may be examples of the corresponding devices described with reference to FIG. 1 or 2.

By way of example, the timeline 800 indicates that the UE receives transmissions (e.g., PDSCH transmissions) in accordance with a CDRX mode, and receives transmissions during a first time period 805, a second time period 805-a, and a third time period 805-b, but not during a first gap period 810 or a second gap period 810-a. During each of the first time period 805, the second time period 805-a, and the third time period 805-b, and by way of example, the UE may receive a transmission (e.g., a PDSCH) during a number of subframes (e.g., during 2 subframes or 2 ms during the first time period 805, and during 20 subframes or 20 ms during each of the second time period 805-a and the third time period 805-b).

At the beginning of the first time period 805, and by way of example, HORxD may be disabled (or OFF) at the UE, and the UE may begin counting subframes within a first transmission scheduling rate determination time period 815. By way of example, the first transmission scheduling rate determination time period 815 is shown to be 10 ms (or 10 subframes). At the end of the first transmission scheduling rate determination time period 815, the number of ON subframes received by the UE during the first transmission scheduling rate determination time period 815 is 4 (e.g., SF_total=4, and SF_scheduled=4). Because the number of ON subframes received by the UE during the first transmission scheduling rate determination time period 815 is less than a threshold (e.g., less than 10 subframes), the first transmission scheduling rate determination time period 815 may be considered invalid or be extended. By way of example, FIG. 8 assumes the first transmission scheduling rate determination time period 815 is extended (e.g., for the duration of an additional transmission scheduling rate determination period (e.g., for 10 subframes)).

At the end of the extended first transmission scheduling rate determination time period 815-*a*, the number of ON subframes received by the UE during the extended first transmission scheduling rate determination time period 815-*a* is 14 (e.g., SF_total=14, and SF_scheduled=14). From these values, a first transmission scheduling rate may be determined (e.g., first transmission scheduling rate=14/14=100%). Assuming the first transmission scheduling rate exceeds a threshold (e.g., $S_{th,2}$), a first determination to enable HORxD (e.g., transition HORxD from OFF-to-ON) may be made at time 820. However, before resources are allocated and power is consumed for HORxD enablement, the determination to enable HORxD may be confirmed. To perform the confirmation, the UE may begin counting subframes within a second transmission scheduling rate determination time period 815-*b* commencing at time 820.

By way of example, the second transmission scheduling rate determination time period 815-*b* is shown to be 10 ms (or 10 subframes) and extend into the second gap period 810-*a*. A HORxD enablement/disablement determination may therefore be delayed until a next time period in which ON subframes are received (e.g., until the third time period 805-*b*). In other examples, a HORxD enablement/disablement determination may not be delayed. At the end of the second transmission scheduling rate determination time period 815-*b*, the number of ON subframes received by the UE during the second transmission scheduling rate determination time period 815 is 8 (e.g., SF_total=8, and SF_scheduled=8). Because the number of ON subframes received by the UE during the second transmission scheduling rate determination time period 815-*b* is less than a threshold (e.g., less than 10 subframes), the second transmission scheduling rate determination time period 815-*b* may be considered invalid or be extended. By way of example, FIG. 8 assumes the second transmission scheduling rate determination time period 815-*b* is extended (e.g., for the duration of an additional transmission scheduling rate determination period (e.g., for 10 subframes)).

At the end of the extended second transmission scheduling rate determination time period 815-*c*, the number of ON subframes received by the UE during the extended second transmission scheduling rate determination time period 815-*c* is 18 (e.g., SF_total=18, and SF_scheduled=18). From these values, a second transmission scheduling rate may be determined (e.g., second transmission scheduling rate=18/18=100%). Assuming the second transmission scheduling rate exceeds a threshold (e.g., $S_{th,2}$), a second determination to enable HORxD (e.g., transition HORxD from OFF-to-ON) may be made at time 825, thereby confirming the enablement determination made at time 820. HORxD may be enabled at time 825. A third transmission scheduling rate determination time period (not shown) may commence at time 825.

In some examples, a channel quality (e.g., a SINR) may be evaluated at each of the times at which a transmission scheduling rate is determined in FIG. 3, 4, 5, 6, 7, or 8. If the channel quality (e.g., SINR) is below a threshold (e.g., worse than $SINR_{low}$), HORxD may be enabled. In some examples, HORxD may be enabled regardless of a determined transmission scheduling rate. In some examples, channel quality may be evaluated prior to determining a transmission scheduling rate, and if a determination to enable HORxD based on channel quality is made, a transmission scheduling rate may not be determined.

Figure 9:
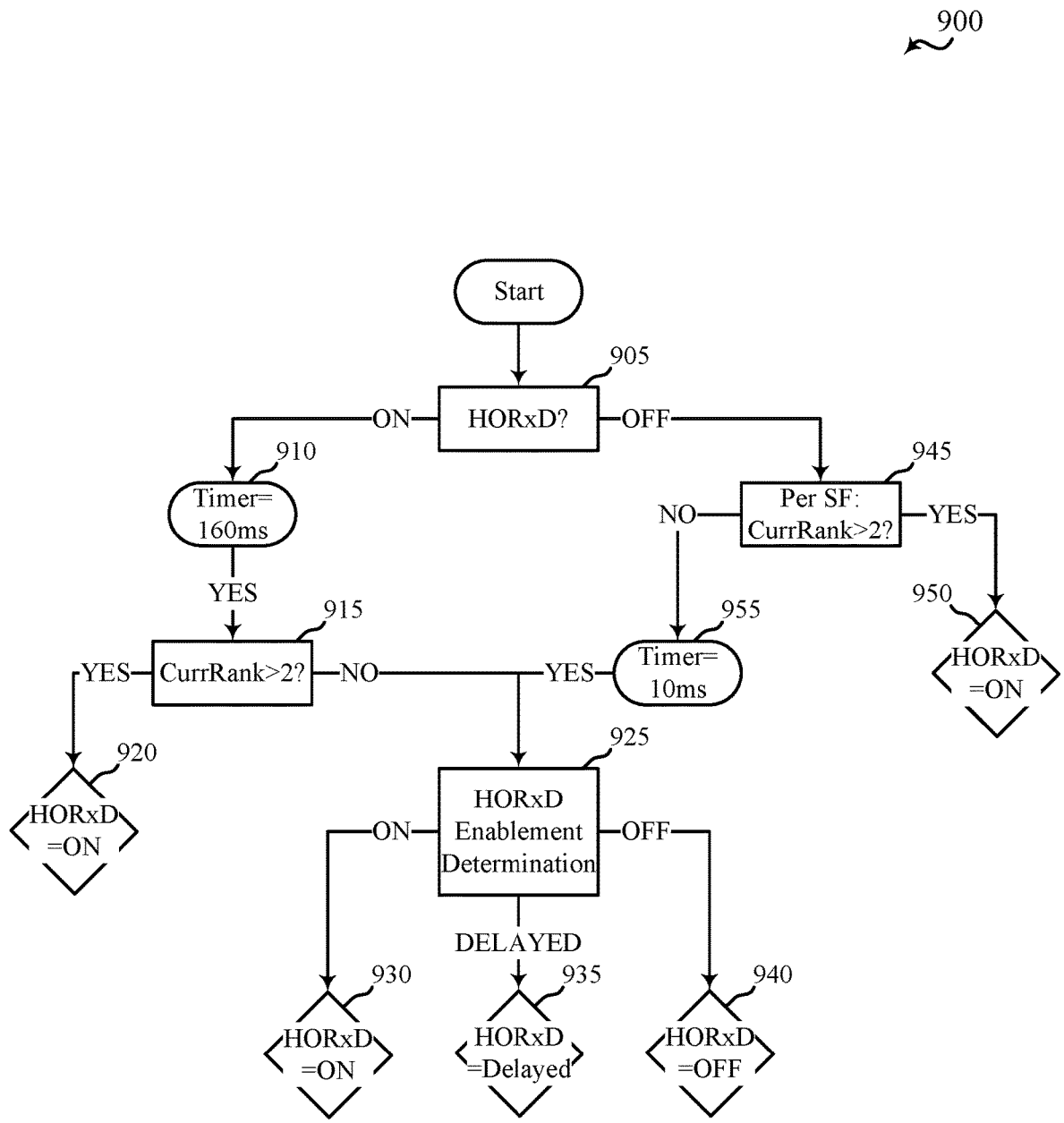
FIG. 9 shows a flow chart illustrating an example of a method for enabling or disabling HORxD for a channel based on a rank of the channel, in accordance with various aspects of the present disclosure.

FIG. 9 shows a flow chart illustrating an example of a method 900 for enabling or disabling HORxD for a channel based on a rank of the channel, in accordance with various aspects of the present disclosure. In some examples, the method 900 may be performed by one or more of the UEs 115 or 215 described with reference to FIG. 1 or 2. In some examples, a UE may execute one or more sets of codes to control the functional elements of the UE to perform the functions described below. Additionally or alternatively, the UE may perform one or more of the functions described below using special-purpose hardware.

At 905, HORxD may be initialized to, or may already be set to, an enabled state (ON state) or a disabled state (OFF state). When HORxD is set to an enabled state at 905, a timer (e.g., a 160 ms timer) may be started and monitored at 910. In some examples, the timer may be instantiated as a count of subframes. Upon expiration of the timer (indicated by "YES"), the UE may determine, at 915, whether a current rank (CurrRank) of the channel is greater than a threshold rank (e.g., is CurrRank>2). When the current rank is greater than the threshold rank, the UE may determine to maintain HORxD in an enabled state at 920, and the UE may reset subframe counts (e.g., SF_total and SF_scheduled) that could have been used for determining a transmission scheduling rate. When the current rank is not greater than the threshold rank, a HORxD enablement/disablement determination may be made at 925, based on a determined channel quality and/or transmission scheduling rate.

At 925, a determination may be made to enable HORxD (or maintain HORxD in an enabled state) and reset subframe counts at 930, disable HORxD (or maintain HORxD in a disabled state) and reset subframe counts at 940, or delay or confirm a HORxD enablement/disablement determination at 935. When delaying or confirming a HORxD enablement/disablement determination, subframe counts may not be reset. An example of a method for making a HORxD enablement determination at 925 is described in more detail with reference to FIG. 10.

When HORxD is set to a disabled state at 905, the UE may determine, at 945, whether the current rank (e.g., or a scheduled rank) of the channel is greater than the threshold rank (e.g., is CurrRank>2) for each subframe. When the current rank is greater than the threshold rank, the UE may determine to enable HORxD at 950, and may reset subframe counts that could have been used for determining a transmission scheduling rate. The operations at 945 and 950 may provide a sort of "panic mode" for quickly enabling HORxD when a scheduled rank for the channel is determined to need HORxD.

In parallel with the per subframe determination made at 945, a timer (e.g., a 10 ms timer) may be started and monitored at 955 when HORxD is determined to be set to a disabled state at 905. In some examples, the timer may be instantiated as a count of subframes. When it is determined that the current rank (e.g., or scheduled rank) is not greater than the threshold rank, at 945, the timer started at 955 may be incremented. Upon expiration of the timer (indicated by "YES") without triggering an enablement of HORxD at 950, a HORxD enablement/disablement determination may be made at 925, based on a determined channel quality and/or transmission scheduling rate.

In some examples, the current rank may be determined as max(CCH rank, last CSF RI), where CCH rank is a scheduled rank for the channel (e.g., a rank scheduled by a base station) and CSF RI is a channel state feedback (CSF) rank indicator (RI) reported by the UE (i.e., a reported rank for the channel).

Figure 10:
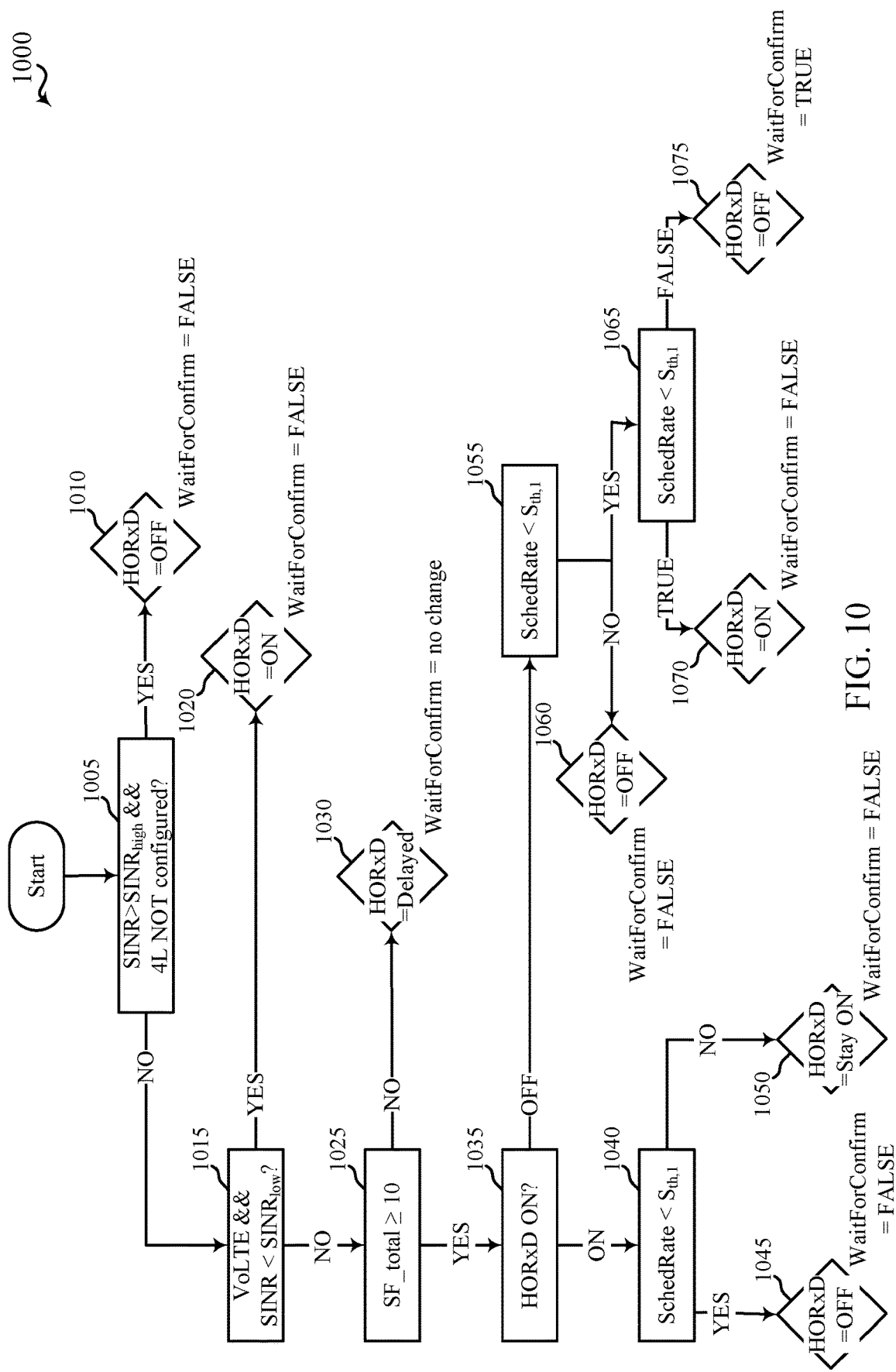
FIG. 10 shows a flow chart illustrating an example of a method for enabling or disabling HORxD for a channel based on a channel quality and/or transmission scheduling rate, in accordance with various aspects of the present disclosure.

FIG. 10 shows a flow chart illustrating an example of a method 1000 for enabling or disabling HORxD for a channel based on a channel quality and/or transmission scheduling rate, in accordance with various aspects of the present disclosure. In some examples, the method 1000 may be performed by one or more of the UEs 115 or 215 described with reference to FIG. 1 or 2. In some examples, a UE may execute one or more sets of codes to control the functional elements of the UE to perform the functions described below. Additionally or alternatively, the UE may perform one or more of the functions described below using special-purpose hardware. The method 1000 is an example of the operations that may be performed at 925 in FIG. 9.

At 1005, the UE may determine whether a channel quality (e.g., a SINR) of the channel is higher than a satisfactory channel quality threshold (e.g., greater than $SINR_{high}$), and whether 4L (4 layer mode) is not configured (e.g., by a network operating entity). The determination of whether 4L is configured may represent an example of a network capability. When the channel quality is higher than (i.e., better than) the satisfactory channel quality threshold and 4L is not configured, the method 1000 may proceed to 1010, where the UE may determine to disable HORxD (or maintain HORxD in a disabled state). The UE may also set the variable WaitForConfirmation to FALSE at 1010. Otherwise, the method 1000 may continue at 1015.

At 1015, the UE may determine whether VoLTE traffic is scheduled for receipt during a time period for which a transmission scheduling rate is to be determined (e.g., a transmission scheduling rate determination time period), and whether the channel quality is lower than a non-satisfactory channel quality threshold. In some examples, the satisfactory channel quality threshold may be much greater than the non-satisfactory channel quality threshold. In other examples, the satisfactory channel quality threshold and non-satisfactory channel quality threshold may be closer to equal or equal. When VoLTE traffic is scheduled for receipt during the time period and the channel quality is lower than (i.e., worse than) the non-satisfactory channel quality threshold, the method 1000 may proceed to 1020, where the UE may determine to enable HORxD (or maintain HORxD in an enabled state). The UE may also set the variable WaitForConfirmation to FALSE at 1020. Otherwise, the method 1000 may continue at 1025.

At 1025, the UE may determine whether a threshold number of subframes (e.g., 10 subframes) have been received both during the time period for which a transmission scheduling rate is to be determined and while the UE is in an awake state. If not, the UE may determine to extend the transmission schedule rate determination time period at 1030, as described, for example, with reference to FIG. 6, 7, or 8. Otherwise, the method 1000 may continue at 1035.

At 1035, the UE may determine whether HORxD is enabled or disabled. When the UE determines that HORxD is enabled (e.g., "ON"), the method 1000 may continue at block 1040. When the UE determines that HORxD is disabled (e.g., "OFF"), the method 1000 may continue at block 1055.

At 1040, the UE may determine a transmission scheduling rate and determine whether the transmission scheduling rate is lower than a threshold (e.g., $S_{th,1}$, described with reference to FIG. 2). When the UE determines at 1040 that the transmission scheduling rate is lower than the threshold, the UE may determine at 1045 to disable HORxD, and may set the variable WaitForConfirmation to FALSE. When the UE determines at 1040 that the transmission scheduling rate is higher than the threshold, the UE may determine at 1050 to maintain HORxD in an enabled state, and may set the variable WaitForConfirmation to FALSE.

At 1055, the UE may determine a transmission scheduling rate and determine whether the transmission scheduling rate is higher than a threshold (e.g., $S_{th,2}$, described with reference to FIG. 2). When the UE determines at 1055 that the transmission scheduling rate is not higher than the threshold, the UE may determine to maintain HORxD in a disabled state at 1060, and may set the variable WaitForConfirmation to FALSE. When the UE determines at 1055 that the transmission scheduling rate is higher than the threshold, the UE may determine the current state of the variable WaitForConfirmation at 1065.

When the UE determines at 1065 that the variable WaitForConfirmation is TRUE, the UE may determine to enable HORxD at 1070. The UE may also reset the variable WaitForConfirmation to FALSE at 1070. When the UE determines at 1065 that the variable WaitForConfirmation is FALSE, the UE may determine to maintain HORxD in a disable state at 1075, and may set the variable WaitForConfirmation to TRUE. By setting the variable WaitForConfirmation to TRUE, HORxD may be enabled after a next evaluation of the variable WaitForConfirmation at 1065, thereby confirming a determination to enable HORxD, as described with reference to FIG. 4, 6, or 8.

Figure 11:
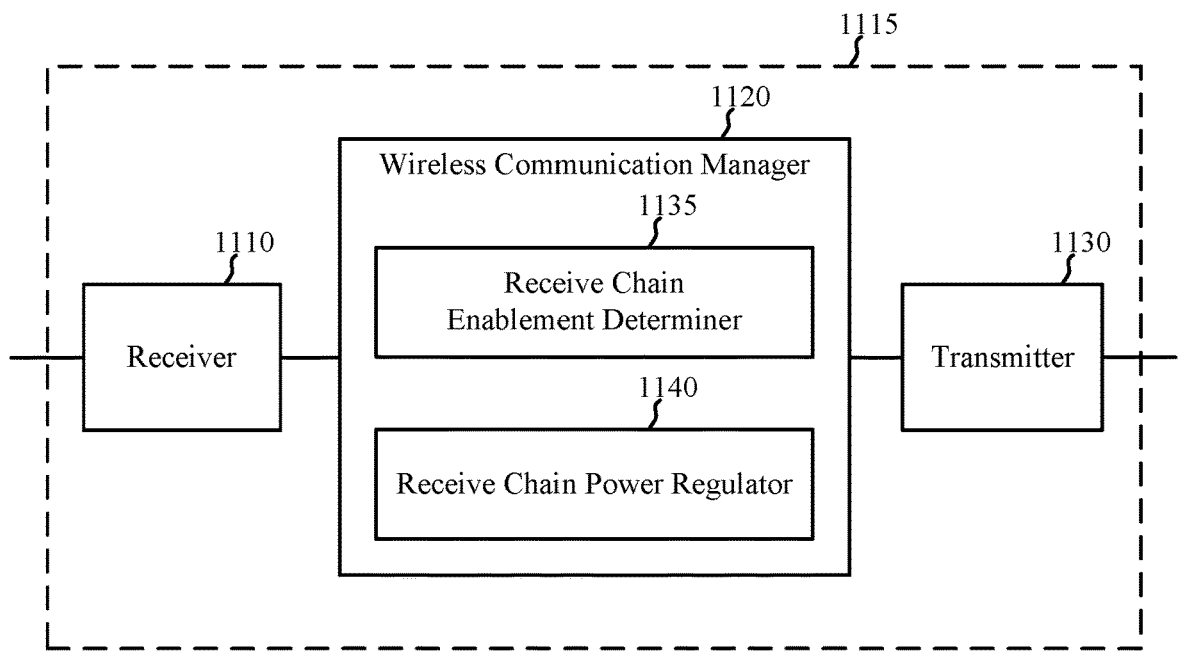
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. The apparatus 1115 may be an example of aspects of one or more of the UEs 115 or 215 described with reference to FIG. 1 or 2. The apparatus 1115 may also be or include a processor. The apparatus 1115 may include a receiver 1110, a wireless communication manager 1120, and a transmitter 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one radio frequency (RF) receiver, such as at least one RF receiver operable to receive transmissions over at least one radio frequency spectrum band. In some examples, one or more of the at least one radio frequency spectrum band may be used for LTE communications, as described, for example, with reference to FIG. 1, 2, 3, 4, 5, 6, 7, 8, 9, or 10. The receiver 1110 may be used to receive various data or control signals (i.e., transmissions) over one or more communication links or channels of a wireless communication system, such as one or more communication links 125 or channels of the wireless communication system 100 described with reference to FIG. 1 or the MIMO communication system 200 described with reference to FIG. 2.

In some examples, the transmitter 1130 may include at least one RF transmitter, such as at least one RF transmitter operable to transmit over at least one RF spectrum band. The transmitter 1130 may be used to transmit various data or control signals (i.e., transmissions) over one or more communication links or channels of a wireless communication system, such as one or more communication links 125 or channels of the wireless communication system 100 described with reference to FIG. 1 or the MIMO communication system 200 described with reference to FIG. 2.

In some examples, the wireless communication manager 1120 may be used to manage one or more aspects of wireless communication for the apparatus 1115. In some examples, part of the wireless communication manager 1120 may be incorporated into or shared with the receiver 1110 or the transmitter 1130. In some examples, the wireless communication manager 1120 may include a receive chain enablement determiner 1135 and a receive chain power regulator 1140.

In a first configuration, the receive chain enablement determiner 1135 may be used to determine a number of receive chains, of a plurality of receive chains, to enable for a channel. The number of receive chains to enable may be determined based at least in part on a transmission scheduling rate for the apparatus 1115, a channel quality of the channel, a rank for the channel, and/or a type of traffic scheduled for the channel. In some examples, the rank for the channel may be based at least in part on a scheduled rank for the channel, or a reported rank for the channel, or a combination thereof. In some examples, the determined number of receive chains may be two receive chains or four receive chains. In some cases, the number of receive chains to enable may be determined based at least in part on a network capability (e.g., a maximum supported rank).

In a second configuration, the receive chain enablement determiner 1135 may be used to compare a channel quality (e.g., a SINR) of a channel to a satisfactory channel quality threshold, and to determine a number of receive chains, of a plurality of receive chains, to enable for the channel. The number of receive chains to enable may be determined based at least in part on a transmission scheduling rate for the apparatus 1115 and a result of the channel quality comparison. In some examples, the determining may be further based at least in part on a rank for the channel.

In a third configuration, the wireless communication manager 1120 may be used to determine a transmission scheduling rate for the apparatus 1115 during a time period (e.g., a transmission scheduling rate determination time period). The transmission scheduling rate may be based at least in part on a number of TTIs the apparatus 1115 is awake to listen to the channel during the time period, or a number of TTIs the apparatus 1115 is scheduled to receive a transmission on the channel during the time period, or a type of traffic scheduled for the channel during the time period, or a combination thereof. Also in the third configuration, the receive chain enablement determiner 1135 may be used to determine a number of receive chains, of a plurality of receive chains, to enable for the channel. The number of receive chains to enable may be determined based at least in part on the determined transmission scheduling rate. In some examples, the receive chain enablement determiner 1135 may determine to enable a number of receive chains greater than a number of currently-enabled receive chains for the channel (e.g., when the transmission scheduling rate for the apparatus 1115 is higher than the transmission scheduling rate threshold). In some examples, the receive chain enablement determiner 1135 may further determine the number of receive chains to enable for the channel based at least in part on a channel quality of the channel, or a rank for the channel, or a combination thereof. In some examples, aspects of the first configuration, the second configuration, and the third configuration may be combined.

The receive chain power regulator 1140 may be used to regulate power to the plurality of receive chains based at least in part on the number of receive chains that the receive chain enablement determiner 1135 determines to enable for a channel. In some examples, the receive chain power regulator 1140 may regulate power to the plurality of receive chains by increasing power to a disabled receive chain included in the number of receive chains enabled for the channel or decreasing power to an enabled receive chain not included in the number of receive chains enabled for the channel. In some cases, the receive chain power regulator 1140 may regulate power to the plurality of receive chains by maintaining a power state of an enabled receive chain included in the number of receive chains enabled for the channel or maintaining a power state of a disabled receive chain not included in the number of receive chains enabled for the channel.

Figure 12:
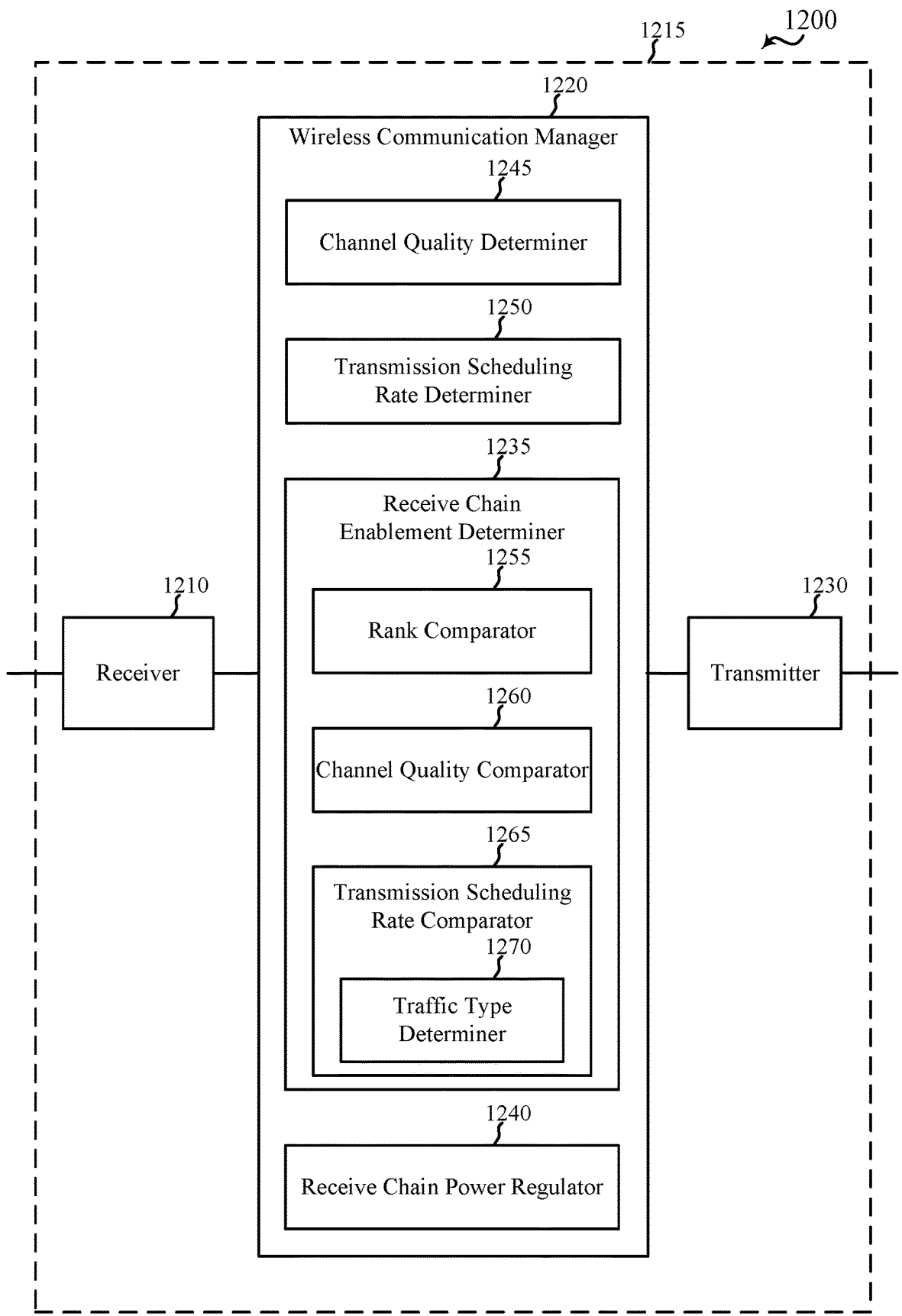
FIG. 12 shows a block diagram of an apparatus for use in wireless communication, in accordance with various aspects of the present disclosure.

FIG. 12 shows a block diagram 1200 of an apparatus 1215 for use in wireless communication, in accordance with various aspects of the present disclosure. The apparatus 1215 may be an example of aspects of one or more of the UEs 115 or 215 described with reference to FIG. 1 or 2. The apparatus 1215 may also be or include a processor. The apparatus 1215 may include a receiver 1210, a wireless communication manager 1220, and a transmitter 1230. Each of these components may be in communication with each other.

The components of the apparatus 1215 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over at least one RF spectrum band. In some examples, one or more of the at least one RF spectrum band may be used for LTE communications, as described, for example, with reference to FIG. 1, 2, 3, 4, 5, 6, 7, 8, 9, or 10. The receiver 1210 may be used to receive various data or control signals (i.e., transmissions) over one or more communication links or channels of a wireless communication system, such as one or more communication links 125 or channels of the wireless communication system 100 described with reference to FIG. 1 or the MIMO communication system 200 described with reference to FIG. 2.

In some examples, the transmitter 1230 may include at least one RF transmitter, such as at least one RF transmitter operable to transmit over at least one RF spectrum band. The transmitter 1230 may be used to transmit various data or control signals (i.e., transmissions) over one or more communication links or channels of a wireless communication system, such as one or more communication links 125 or channels of the wireless communication system 100 described with reference to FIG. 1 or the MIMO communication system 200 described with reference to FIG. 2.

In some examples, the wireless communication manager 1220 may be used to manage one or more aspects of wireless communication for the apparatus 1215. In some examples, part of the wireless communication manager 1220 may be incorporated into or shared with the receiver 1210 or the transmitter 1230. In some examples, the wireless communication manager 1220 may include a channel quality determiner 1245, a transmission scheduling rate determiner 1250, a receive chain enablement determiner 1235, and a receive chain power regulator 1240. The receive chain enablement determiner 1235 may include a rank comparator 1255, a channel quality comparator 1260, and a transmission scheduling rate comparator 1265. The transmission scheduling rate comparator 1265 may include a traffic type determiner 1270.

The channel quality determiner 1245 may be used to determine a channel quality (e.g., a SINR) for a channel. In some examples, the channel quality may be determined as described with reference to FIG. 2, 3, 4, 5, 6, 7, or 8.

The transmission scheduling rate determiner 1250 may be used to determine a transmission scheduling rate for the apparatus 1215. In some examples, the transmission scheduling rate may be determined for a time period (e.g., a transmission scheduling rate determination time period). The transmission scheduling rate may be based at least in part on a number of TTIs the apparatus 1215 is awake to listen to the channel during the time period, or a number of TTIs the apparatus 1215 is scheduled to receive a transmission on the channel during the time period, or a type of traffic scheduled for the channel during the time period, or a combination thereof. In some examples, the transmission scheduling rate may be determined as described with reference to FIG. 2, 3, 4, 5, 6, 7, or 8.

In a first configuration, the rank comparator 1255 may be used to compare the rank of the channel to a threshold rank. In some examples, the rank for the channel may be based at least in part on a scheduled rank for the channel, or a reported rank for the channel, or a combination thereof. In some examples, the comparing may be performed after expiration of a time period following a prior determination of a number of receive chains to enable for the channel (e.g., after a transmission scheduling rate determination time period). In some examples, the comparing may be performed upon receipt of a scheduled rank for the channel. In some examples, the comparing may be performed prior to receiving a TTI corresponding to the scheduled rank for the channel. Also in the first configuration, the receive chain enablement determiner 1235 may be used to determine a number of receive chains, of a plurality of receive chains, to enable for the channel. The number of receive chains to enable may be determined based at least in part on a transmission scheduling rate for the apparatus 1215, a channel quality of the channel, a rank for the channel, and/or a type of traffic scheduled for the channel. In some examples, the determined number of receive chains may be two receive chains or four receive chains. In some examples, the number of receive chains to enable may be determined based at least in part on a result of the rank comparison made by rank comparator 1255. In some examples, the receive chain enablement determiner 1235 may determine to enable at least a predetermined number of the plurality of receive chains when the rank for the channel (and in some examples, the scheduled rank for the channel) is higher than the threshold rank. In some examples, the predetermined number of the plurality of receive chains may include all of the plurality of receive chains.

In a second configuration, the channel quality comparator 1260 may be used to compare the channel quality of the channel to a satisfactory channel quality threshold. Also in the second configuration, the transmission scheduling rate comparator 1265 may be used to compare a transmission scheduling rate for the apparatus 1215 to a transmission scheduling rate threshold. Still further in the second configuration, the receive chain enablement determiner 1235 may be used to determine a number of receive chains, of a plurality of receive chains, to enable for the channel. The number of receive chains to enable may be determined based at least in part on a result of the transmission scheduling rate comparison performed by the transmission scheduling rate comparator 1265 and a result of the channel quality comparison performed by the channel quality comparator 1260. In some examples, the receive chain enablement determiner 1235 may determine to enable a subset (i.e., less than all) of the plurality of receive chains for the channel when the transmission scheduling rate is lower than the transmission scheduling rate threshold and the channel quality is higher than the satisfactory channel quality threshold. In some examples, the determining may be further based at least in part on a rank for the channel.

In a third configuration, the transmission scheduling rate comparator 1265 may be used to compare the transmission scheduling rate for the apparatus 1215 to a transmission scheduling rate threshold after a predetermined count of TTIs in a time period (e.g., a transmission scheduling rate determination time period). In some examples, the predetermined count of TTIs may be based at least in part on the type of traffic scheduled for the channel during the time period (e.g., which may be determined by traffic type determiner 1270). In some examples, the predetermined count of TTIs may not include TTIs transmitted while the apparatus 1215 is in a sleep state. Also in the third configuration, the receive chain enablement determiner 1235 may be used to determine a number of receive chains, of a plurality of receive chains, to enable for the channel. The number of receive chains to enable may be determined based at least in part on the determined transmission scheduling rate. In some examples, the receive chain enablement determiner 1235 may determine to enable a number of receive chains greater than a number of currently-enabled receive chains for the channel (e.g., when the transmission scheduling rate for the apparatus 1215 is higher than the transmission scheduling rate threshold). In some examples, the receive chain enablement determiner 1235 may further determine the number of receive chains to enable for the channel based at least in part on a channel quality of the channel, or a rank for the channel, or a combination thereof. In some examples, aspects of the first configuration, the second configuration, and the third configuration may be combined.

The receive chain power regulator 1240 may be used to regulate power to the plurality of receive chains based at least in part on the number of receive chains that the receive chain enablement determiner 1235 determines to enable for a channel. In some examples, the receive chain power regulator 1240 may regulate power to the plurality of receive chains by increasing power to a disabled receive chain included in the number of receive chains enabled for the channel or decreasing power to an enabled receive chain not included in the number of receive chains enabled for the channel. In some cases, the receive chain power regulator 1240 may regulate power to the plurality of receive chains by maintaining a power state of an enabled receive chain included in the number of receive chains enabled for the channel or maintaining a power state of a disabled receive chain not included in the number of receive chains enabled for the channel.

Figure 13:
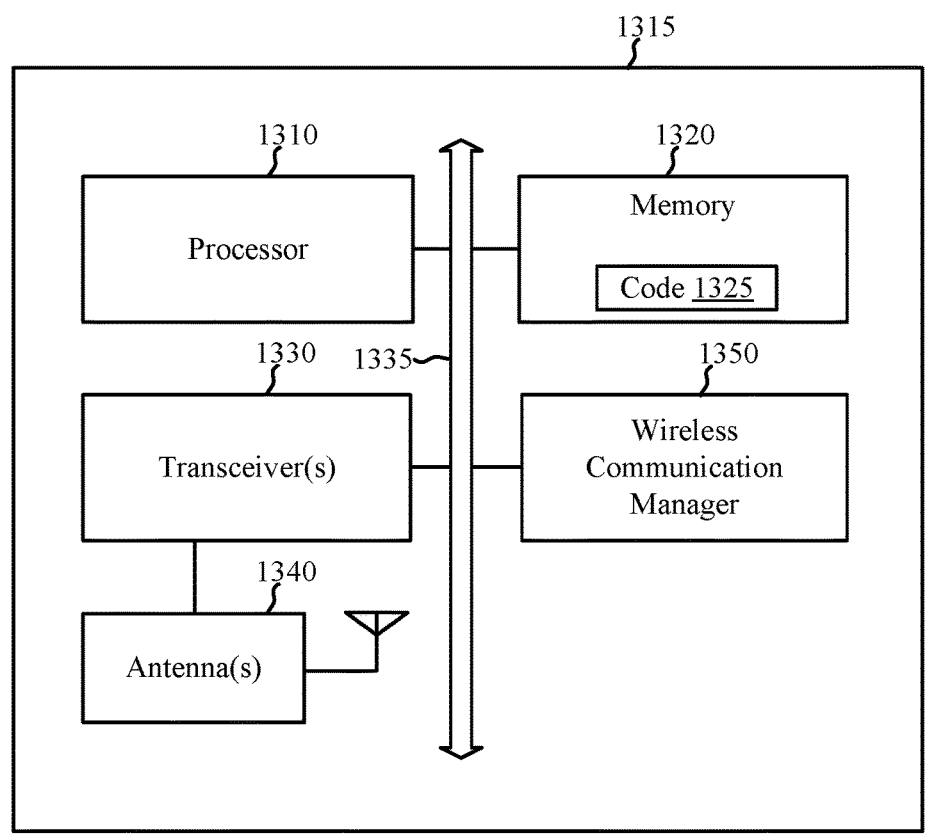
FIG. 13 shows a block diagram of a UE for use in wireless communication, in accordance with various aspects of the present disclosure.

FIG. 13 shows a block diagram 1300 of a UE 1315 for use in wireless communication, in accordance with various aspects of the present disclosure. The UE 1315 may be included or be part of a personal computer (e.g., a laptop computer, a netbook computer, a tablet computer, etc.), a cellular telephone, a PDA, an internet appliance, a gaming console, an e-reader, etc. The UE 1315 may, in some examples, have an internal power supply (not shown), such as a small battery, to facilitate mobile operation. In some examples, the UE 1315 may be an example of aspects of one or more of the UEs 115 or 215, or aspects of the apparatus 1115 or 1215, described with reference to FIG. 1, 2, 11, or 12. The UE 1315 may be configured to implement at least some of the UE and/or apparatus features and functions described with reference to FIG. 1, 2, 3, 4, 5, 6, 7, 8, 9, 10, 11, or 12.

The UE 1315 may include a processor 1310, a memory 1320, at least one transceiver (represented by transceiver(s) 1330), at least one antenna (represented by antenna(s) 1340), and a wireless communication manager 1350. Each of these components may be in communication with each other, directly or indirectly, over one or more buses 1335.

The memory 1320 may include random access memory (RAM) or read-only memory (ROM). The memory 1320 may store computer-readable, computer-executable code 1325 containing instructions that are configured to, when executed, cause the processor 1310 to perform various functions described herein related to wireless communication, including, for example, determining a transmission scheduling rate for the UE 1315, determining a channel quality of a channel, determining a rank of the channel, determining a type of traffic scheduled for the channel, determining a number of receive chains to enable for the channel based at least in part on the determined transmission scheduling rate, channel quality, rank, or traffic type, and/or regulating power to a plurality of receive chains, as described with reference to FIG. 1, 2, 3, 4, 5, 6, 7, 8, 9, 10, 11, or 12. Alternatively, the computer-executable code 1325 may not be directly executable by the processor 1310 but be configured to cause the UE 1315 (e.g., when compiled and executed) to perform various of the functions described herein.

The processor 1310 may include an intelligent hardware device, e.g., a central processing unit (CPU), a microcontroller, an ASIC, etc. The processor 1310 may process information received through the transceiver(s) 1330 or information to be sent to the transceiver(s) 1330 for transmission through the antenna(s) 1340. The processor 1310 may handle, alone or in connection with the wireless communication manager 1350, various aspects of communicating over (or managing communications over) one or more RF spectrum bands.

The transceiver(s) 1330 may include a modem configured to modulate packets and provide the modulated packets to the antenna(s) 1340 for transmission, and to demodulate packets received from the antenna(s) 1340. The transceiver(s) 1330 may, in some examples, be implemented as one or more transmitters and one or more separate receivers. The transceiver(s) 1330 may support communications over one or more wireless communication links. The transceiver(s) 1330 may be configured to communicate bi-directionally, via the antenna(s) 1340, with one or more base stations or other devices, such as one or more of the base stations 105 or 205 described with reference to FIG. 1 or 2. While the UE 1315 may include a single antenna, there may be examples in which the UE 1315 may include multiple antennas.

The wireless communication manager 1350 may be configured to perform or control some or all of the UE or apparatus features or functions described with reference to FIG. 1, 2, 3, 4, 5, 6, 7, 8, 9, 10, 11, or 12 related to wireless communication over one or more radio frequency spectrum bands. The wireless communication manager 1350, or portions of it, may include a processor, or some or all of the functions of the wireless communication manager 1350 may be performed by the processor 1310 or in connection with the processor 1310. In some examples, the wireless communication manager 1350 may be an example of the wireless communication manager 284, 1120, or 1220 described with reference to FIG. 2, 11, or 12.

Figure 14:
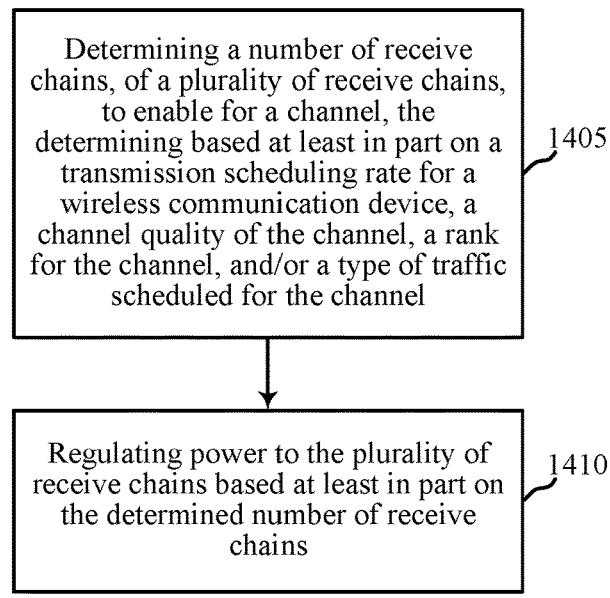
FIG. 14 is a flow chart illustrating an example of a method for wireless communication at a wireless communication device, in accordance with various aspects of the present disclosure.

FIG. 14 is a flow chart illustrating an example of a method 1400 for wireless communication at a wireless communication device, in accordance with various aspects of the present disclosure. For clarity, the method 1400 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1405, the method 1400 may include determining a number of receive chains, of a plurality of receive chains, to enable for a channel. The determining may be based at least in part on a transmission scheduling rate for the wireless communication device, a channel quality of the channel, a rank for the channel, and/or a type of traffic scheduled for the channel. In some examples, the rank for the channel may be based at least in part on a scheduled rank for the channel, or a reported rank for the channel, or a combination thereof. In some examples, the determined number of receive chains may be two receive chains or four receive chains. In some examples, the channel may be configured for LTE communication. The operation(s) at block 1405 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1410, the method 1400 may include regulating power to the plurality of receive chains based at least in part on the determined number of receive chains. In some examples, regulating power to the plurality of receive chains may include at least one of increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1410 may be performed using the wireless communication manager 284, 1120, 1220, or 1350 described with reference to FIG. 2, 11, 12, or 13, or the receive chain power regulator 1140 or 1240 described with reference to FIG. 11 or 12.

Figure 15:
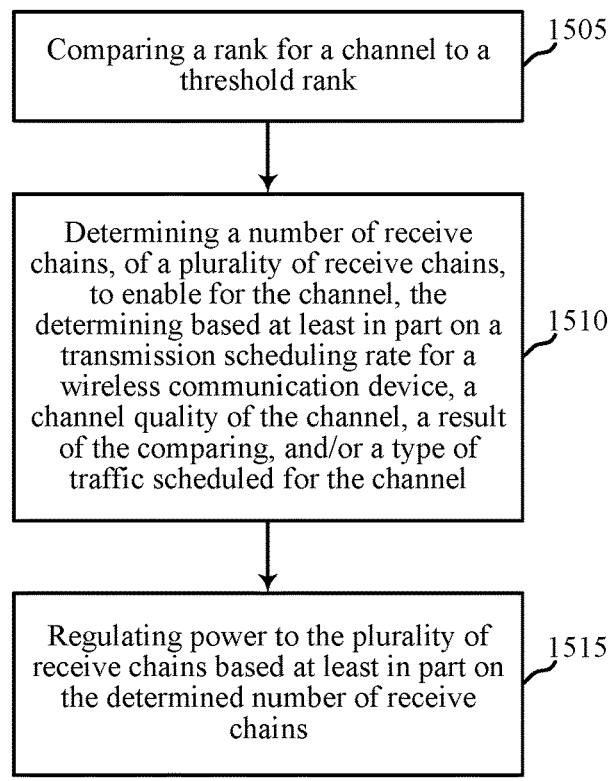
FIG. 15 is a flow chart illustrating an example of a method for wireless communication at a wireless communication device, in accordance with various aspects of the present disclosure.

FIG. 15 is a flow chart illustrating an example of a method 1500 for wireless communication at a wireless communication device, in accordance with various aspects of the present disclosure. For clarity, the method 1500 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1505, the method 1500 may include comparing a rank of a channel to a threshold rank. In some examples, the rank for the channel may be based at least in part on a scheduled rank for the channel, or a reported rank for the channel, or a combination thereof. In some examples, the channel may be configured for LTE communication. In some examples, the comparing may be performed after expiration of a time period following a prior determination of a number of receive chains to enable for the channel (e.g., after a transmission scheduling rate determination time period). In some examples, the comparing may be performed upon receipt of a scheduled rank for the channel. In some examples, the comparing may be performed prior to receiving a TTI corresponding to the scheduled rank for the channel. The operation(s) at block 1505 may be performed using the wireless communication manager 284, 1120, 1220, or 1350 described with reference to FIG. 2, 11, 12, or 13, the receive chain enablement determiner 1135 or 1235 described with reference to FIG. 11 or 12, or the rank comparator 1255 described with reference to FIG. 12.

At block 1510, the method 1500 may include determining a number of receive chains, of a plurality of receive chains, to enable for the channel. The determining may be based at least in part on a transmission scheduling rate for the wireless communication device, a channel quality of the channel, a rank for the channel, and/or a type of traffic scheduled for the channel. In some examples, the determined number of receive chains may be two receive chains or four receive chains. In some examples, the determining may be based at least in part on a result of the comparing performed at block 1505. In some examples, the determining may include determining to enable at least a predetermined number of the plurality of receive chains when the rank for the channel (and in some examples, the scheduled rank for the channel) is higher than the threshold rank. In some examples, the predetermined number of the plurality of receive chains may include all of the plurality of receive chains. The operation(s) at block 1510 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1515, the method 1500 may include regulating power to the plurality of receive chains based at least in part on the determined number of receive chains. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1515 may be performed using the wireless communication manager 284, 1120, 1220, or 1350 described with reference to FIG. 2, 11, 12, or 13, or the receive chain power regulator 1140 or 1240 described with reference to FIG. 11 or 12.

Figure 16:
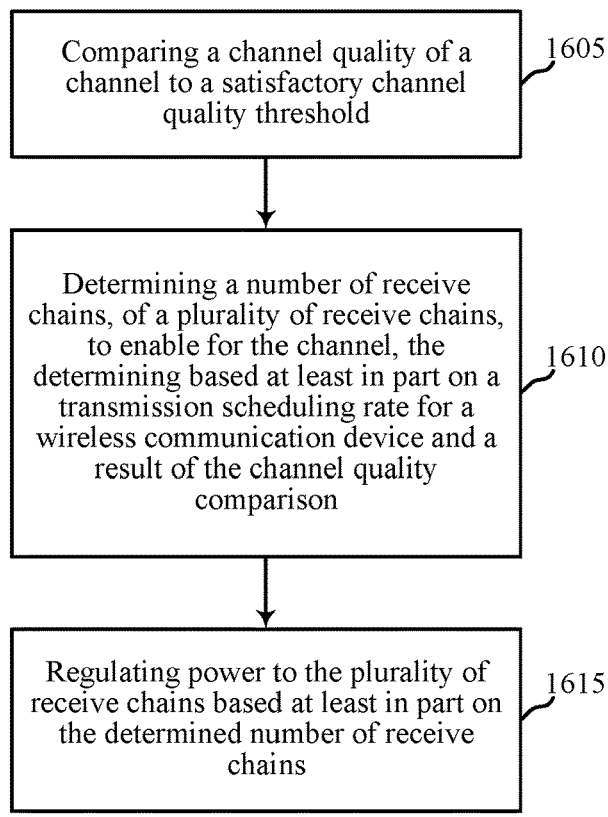
FIG. 16 is a flow chart illustrating an example of a method for wireless communication at a wireless communication device, in accordance with various aspects of the present disclosure.

FIG. 16 is a flow chart illustrating an example of a method 1600 for wireless communication at a wireless communication device, in accordance with various aspects of the present disclosure. For clarity, the method 1600 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1605, the method 1600 may include comparing a channel quality (e.g., a SINR) of a channel to a satisfactory channel quality threshold. The operation(s) at block 1605 may be performed using the wireless communication manager 284, 1120, 1220, or 1350 described with reference to FIG. 2, 11, 12, or 13, the receive chain enablement determiner 1135 or 1235 described with reference to FIG. 11 or 12, or the channel quality comparator 1260 described with reference to FIG. 12.

At block 1610, the method 1600 may include determining a number of receive chains, of a plurality of receive chains, to enable for the channel. The determining may be based at least in part on a transmission scheduling rate for the wireless communication device and a result of the channel quality comparison (performed at block 1605). In some examples, the determining may be further based at least in part on a rank for the channel. In some examples, the determined number of receive chains may be two receive chains or four receive chains. In some examples, the channel may be configured for LTE communication. The operation(s) at block 1610 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1615, the method 1600 may include regulating power to the plurality of receive chains based at least in part on the determined number of receive chains. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1615 may be performed using the wireless communication manager 284, 1120, 1220, or 1350 described with reference to FIG. 2, 11, 12, or 13, or the receive chain power regulator 1140 or 1240 described with reference to FIG. 11 or 12.

Figure 17:
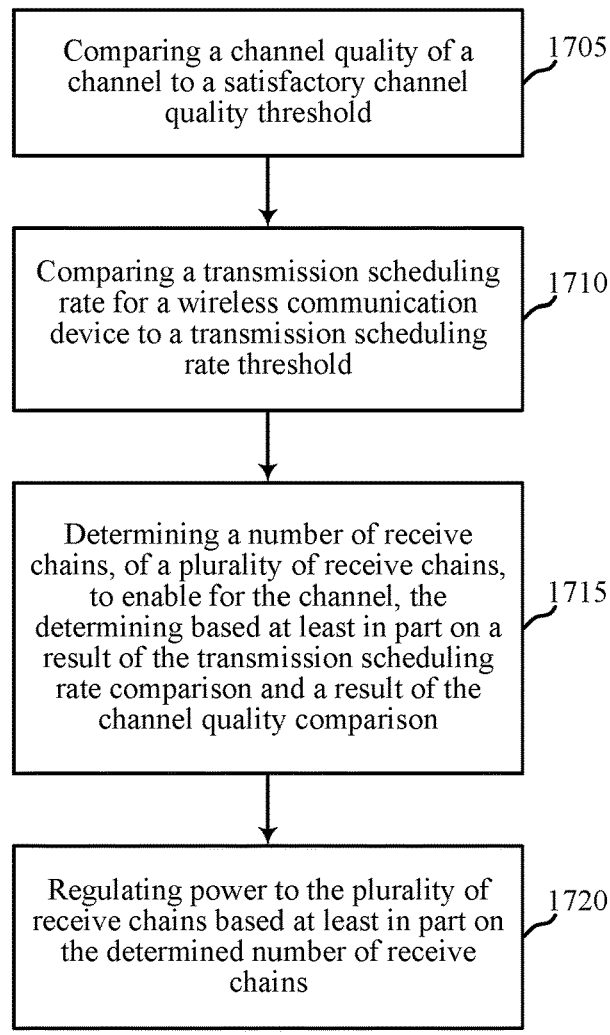
FIG. 17 is a flow chart illustrating an example of a method for wireless communication at a wireless communication device, in accordance with various aspects of the present disclosure.

FIG. 17 is a flow chart illustrating an example of a method 1700 for wireless communication at a wireless communication device, in accordance with various aspects of the present disclosure. For clarity, the method 1700 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1705, the method 1700 may include comparing a channel quality (e.g., a SINR) of a channel to a satisfactory channel quality threshold. The operation(s) at block 1705 may be performed using the wireless communication manager 284, 1120, 1220, or 1350 described with reference to FIG. 2, 11, 12, or 13, the receive chain enablement determiner 1135 or 1235 described with reference to FIG. 11 or 12, or the channel quality comparator 1260 described with reference to FIG. 12.

At block 1710, the method 1700 may include comparing a transmission scheduling rate for the wireless communication device to a transmission scheduling rate threshold. The operation(s) at block 1710 may be performed using the wireless communication manager 284, 1120, 1220, or 1350 described with reference to FIG. 2, 11, 12, or 13, the receive chain enablement determiner 1135 or 1235 described with reference to FIG. 11 or 12, or the transmission scheduling rate comparator 1265 described with reference to FIG. 12.

At block 1715, the method 1700 may include determining a number of receive chains, of a plurality of receive chains, to enable for the channel. The determining may be based at least in part on a result of the transmission scheduling rate comparison (performed at block 1710) and a result of the channel quality comparison (performed at block 1705). In some examples, the determining may include determining to enable a subset (i.e., less than all) of the plurality of receive chains for the channel when the transmission scheduling rate is lower than the transmission scheduling rate threshold and the channel quality is higher than the satisfactory channel quality threshold. In some examples, the determining may be further based at least in part on a rank for the channel. In some examples, the determined number of receive chains may be two receive chains or four receive chains. In some examples, the channel may be configured for LTE communication. The operation(s) at block 1715 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1720, the method 1700 may include regulating power to the plurality of receive chains based at least in part on the determined number of receive chains. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1720 may be performed using the wireless communication manager 284, 1120, 1220, or 1350 described with reference to FIG. 2, 11, 12, or 13, or the receive chain power regulator 1140 or 1240 described with reference to FIG. 11 or 12.

Figure 18:
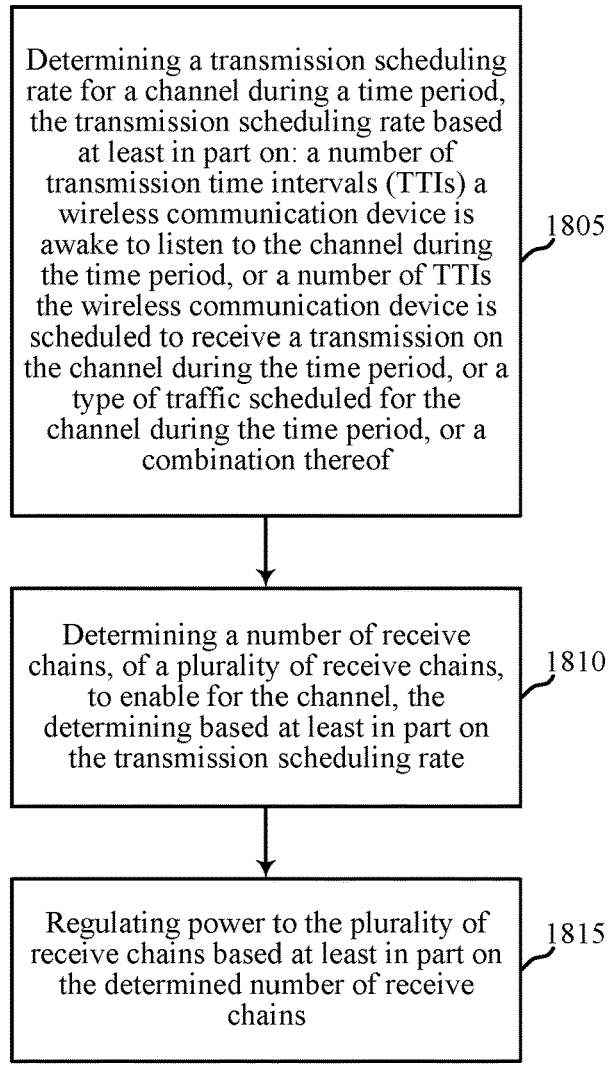
FIG. 18 is a flow chart illustrating an example of a method for wireless communication at a wireless communication device, in accordance with various aspects of the present disclosure.

FIG. 18 is a flow chart illustrating an example of a method 1800 for wireless communication at a wireless communication device, in accordance with various aspects of the present disclosure. For clarity, the method 1800 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1805, the method 1800 may include determining a transmission scheduling rate for the wireless communication device during a time period (e.g., a transmission scheduling rate determination time period). The transmission scheduling rate may be based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The operation(s) at block 1805 may be performed using the wireless communication manager 284, 1120, 1220, or 1350 described with reference to FIG. 2, 11, 12, or 13, or the transmission scheduling rate determiner 1250 described with reference to FIG. 12.

At block 1810, the method 1800 may include determining a number of receive chains, of a plurality of receive chains, to enable for the channel. The determining may be based at least in part on the transmission scheduling rate determined at block 1805. In some examples, the determining may include determining to enable a number of receive chains greater than a number of currently-enabled receive chains for the channel (e.g., when the transmission scheduling rate for the wireless communication device is higher than the transmission scheduling rate threshold for enabling receive chains). In some examples, the determining the number of receive chains to enable for the channel may be further based at least in part on: a channel quality of the channel, or a rank for the channel, or a combination thereof. In some examples, the determined number of receive chains may be two receive chains or four receive chains. In some examples, the channel may be configured for LTE communication. The operation(s) at block 1810 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1815, the method 1800 may include regulating power to the plurality of receive chains based at least in part on the determined number of receive chains. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1815 may be performed using the wireless communication manager 284, 1120, 1220, or 1350 described with reference to FIG. 2, 11, 12, or 13, or the receive chain power regulator 1140 or 1240 described with reference to FIG. 11 or 12.

Figure 19:
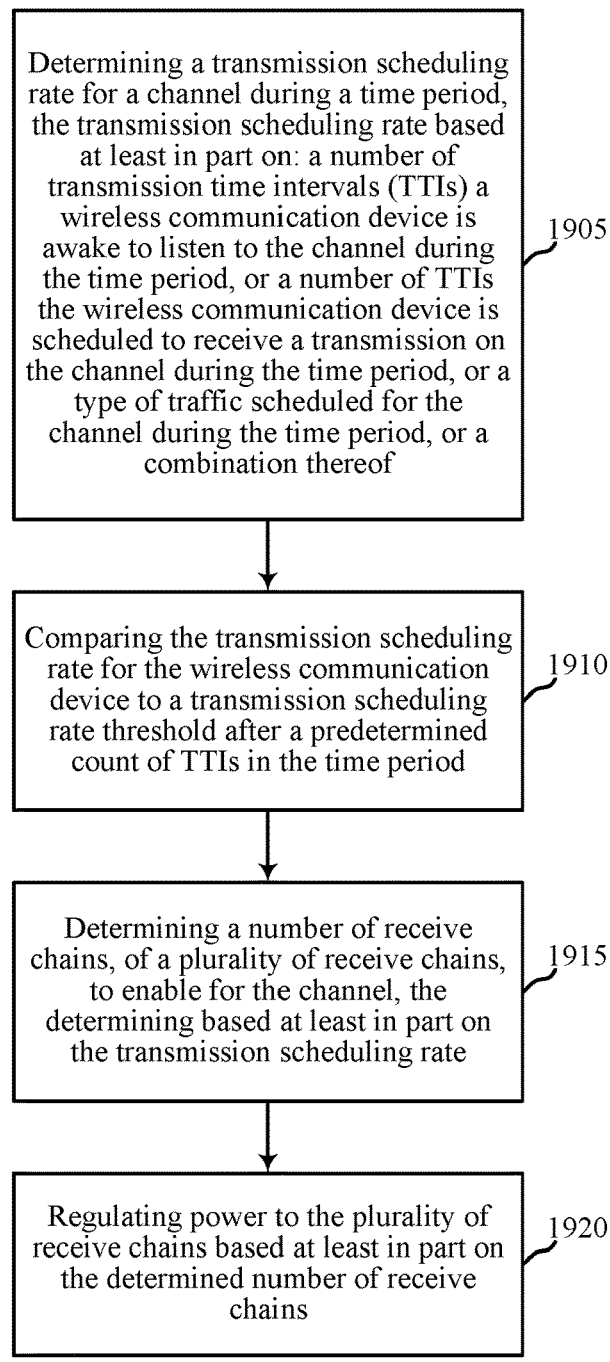
FIG. 19 is a flow chart illustrating an example of a method for wireless communication at a wireless communication device, in accordance with various aspects of the present disclosure.

FIG. 19 is a flow chart illustrating an example of a method 1900 for wireless communication at a wireless communication device, in accordance with various aspects of the present disclosure. For clarity, the method 1900 is described below with reference to aspects of one or more of the UEs 115, 215, or 1315 described with reference to FIG. 1, 2, or 13, or aspects of one or more of the apparatuses 1115 or 1215 described with reference to FIG. 11 or 12. In some examples, a wireless communication device (e.g., a UE or apparatus) may execute one or more sets of codes to control the functional elements of the wireless communication device to perform the functions described below. Additionally or alternatively, the wireless communication device may perform one or more of the functions described below using special-purpose hardware.

At block 1905, the method 1900 may include determining a transmission scheduling rate for the wireless communication device during a time period (e.g., a transmission scheduling rate determination time period). The transmission scheduling rate may be based at least in part on: a number of TTIs the wireless communication device is awake to listen to the channel during the time period, or a number of TTIs the wireless communication device is scheduled to receive a transmission on the channel during the time period, or a type of traffic scheduled for the channel during the time period, or a combination thereof. The operation(s) at block 1905 may be performed using the wireless communication manager 284, 1120, 1220, or 1350 described with reference to FIG. 2, 11, 12, or 13, or the transmission scheduling rate determiner 1250 described with reference to FIG. 12.

At block 1910, the method 1900 may include comparing the transmission scheduling rate for the wireless communication device to a first transmission scheduling rate threshold for enabling receive chains or a second transmission scheduling rate threshold for disabling receive chains after a predetermined count of TTIs in the time period. In some examples, the predetermined count of TTIs may be based at least in part on the type of traffic scheduled for the channel during the time period. In some examples, the predetermined count of TTIs may not include TTIs transmitted while the wireless communication device is in a sleep state. The operation(s) at block 1910 may be performed using the wireless communication manager 284, 1120, 1220, or 1350 described with reference to FIG. 2, 11, 12, or 13, the receive chain enablement determiner 1135 or 1235 described with reference to FIG. 11 or 12, or the transmission scheduling rate comparator 1265 or traffic type determiner 1270 described with reference to FIG. 12.

At block 1915, the method 1900 may include determining a number of receive chains, of a plurality of receive chains, to enable for the channel. The determining may be based at least in part on the transmission scheduling rate determined at block 1905. In some examples, the determining may include determining to enable a number of receive chains greater than a number of currently-enabled receive chains for the channel (e.g., when the transmission scheduling rate for the wireless communication device is higher than the first transmission scheduling rate threshold for enabling receive chains). In some cases, the determining may include determining to disable at least one receive chain of the plurality of receive chains for the channel (e.g., when the transmission scheduling rate for the wireless communication device is lower than the second transmission scheduling rate threshold for disabling receive chains). In some examples, the determining the number of receive chains to enable for the channel may be further based at least in part on: a channel quality of the channel, or a rank for the channel, or a combination thereof. In some examples, the determined number of receive chains may be two receive chains or four receive chains. In some examples, the channel may be configured for LTE communication. The operation(s) at block 1915 may be performed using the wireless communication manager 284, 1120, 1220, or 1350 described with reference to FIG. 2, 11, 12, or 13, or the receive chain enablement determiner 1135 or 1235 described with reference to FIG. 11 or 12.

At block 1920, the method 1900 may include regulating power to the plurality of receive chains based at least in part on the determined number of receive chains. In some examples, regulating power to the plurality of receive chains may include at least one of: increasing power to a disabled receive chain included in the number of receive chains enabled for the channel, or decreasing power to an enabled receive chain not included in the number of receive chains enabled for the channel, or maintaining a power state of an enabled receive chain included in the number of receive chains enabled for the channel, or maintaining a power state of a disabled receive chain not included in the number of receive chains enabled for the channel. The operation(s) at block 1920 may be performed using the wireless communication manager 284, 1120, 1220, or 1350 described with reference to FIG. 2, 11, 12, or 13, or the receive chain power regulator 1140 or 1240 described with reference to FIG. 11 or 12.

It should be noted that each of the methods 1400, 1500, 1600, 1700, 1800, and 1900 described with reference to FIGS. 14, 15, 16, 17, 18, and 19 is just one implementation and that the operations of the method 1400, 1500, 1600, 1700, 1800, of 1900 may be rearranged or otherwise modified such that other implementations are possible. In some examples, aspects of two or more of the methods 1400, 1500, 1600, 1700, 1800, or 1900 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed spectrum. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a wireless communication device, comprising:
   determining, based at least in part on a first number of enabled receive chains of a plurality of receive chains of the wireless communication device, a transmission scheduling rate for the wireless communication device;
   identifying a network capability comprising a maximum supported rank for a channel;
   determining a second number of receive chains, of the plurality of receive chains, to enable for the channel, the determining based at least in part on the transmission scheduling rate for the wireless communication device, the identified network capability, and a rank for the channel; and regulating power to the plurality of receive chains based at least in part on the determined second number of receive chains.

2. The method of claim 1, further comprising:
comparing the transmission scheduling rate to a first transmission scheduling rate threshold for enabling receive chains or a second transmission scheduling rate threshold for disabling receive chains.

3. The method of claim 2, wherein the determining the second number of receive chains to enable for the channel comprises:
determining to disable at least one receive chain of the plurality of receive chains for the channel when the transmission scheduling rate is lower than the second transmission scheduling rate threshold; or
determining to enable a number of receive chains greater than the first number of enabled receive chains for the channel when the transmission scheduling rate for the wireless communication device is higher than the first transmission scheduling rate threshold.

4. The method of claim 3, wherein the determining to enable the number of receive chains greater than the first number of enabled receive chains further comprises:
comparing a second transmission scheduling rate to the first transmission scheduling rate threshold; and
confirming the number of receive chains greater than the first number of enabled receive chains when the second transmission scheduling rate for the wireless communication device is higher than the first transmission scheduling rate threshold.

5. The method of claim 2, wherein the comparing is performed after an expiration of a time period following a determination of a prior number of receive chains to enable for the channel.

6. The method of claim 2, wherein the comparing the transmission scheduling rate for the wireless communication device to the first transmission scheduling rate threshold or the second transmission scheduling rate threshold is performed a predetermined count of transmission time intervals (TTIs) after a prior comparison.

7. The method of claim 6, wherein the predetermined count of TTIs is based at least in part on a type of traffic scheduled for the channel.

8. The method of claim 6, wherein the predetermined count of TTIs does not include TTIs transmitted while the wireless communication device is in a sleep state.

9. The method of claim 1, further comprising:
comparing a channel quality of the channel to a channel quality threshold;
wherein the determining the second number of receive chains is further based at least in part on the comparison.

10. The method of claim 1, further comprising:
comparing the rank for the channel to a threshold rank;
wherein the determining the second number of receive chains to enable for the channel is based at least in part on a result of the comparison.

11. The method of claim 10, wherein the determining the second number of receive chains to enable for the channel based at least in part on the comparison comprises:
determining to enable at least a predetermined number of the plurality of receive chains when the rank for the channel is higher than the threshold rank.

12. The method of claim 10, wherein the rank for the channel is based at least in part on:
a scheduled rank for the channel, or a reported rank for the channel, or a combination thereof.

13. The method of claim 10, wherein the rank for the channel comprises a scheduled rank and further comprising:
determining to enable at least a predetermined number of the plurality of receive chains when the scheduled rank for the channel is higher than the threshold rank.

14. The method of claim 13, wherein the predetermined number of the plurality of receive chains comprises all of the plurality of receive chains.

15. The method of claim 13, wherein the comparing is performed upon receipt of the scheduled rank for the channel.

16. The method of claim 13, wherein the comparing is performed prior to receiving a transmission time interval corresponding to the scheduled rank for the channel.

17. The method of claim 1, wherein the determining the second number of receive chains is further based at least in part on a type of traffic scheduled for the channel.

18. The method of claim 1, wherein the transmission scheduling rate is based at least in part on:
a number of transmission time intervals (TTIs) the wireless communication device is awake to listen to the channel during a time period, or a number of TTIs the wireless communication device is scheduled to receive a transmission on the channel during the time period, or a type of traffic scheduled for the channel during the time period, or a combination thereof.

19. The method of claim 18, wherein a duration of the time period is based at least in part on the first number of enabled receive chains.

20. The method of claim 1, wherein regulating power to the plurality of receive chains comprises at least one of:
increasing power to a disabled receive chain included in the second number of receive chains enabled for the channel, or decreasing power to an enabled receive chain not included in the second number of receive chains enabled for the channel, or maintaining a power state of an enabled receive chain included in the second number of receive chains enabled for the channel, or maintaining a power state of a disabled receive chain not included in the second number of receive chains enabled for the channel.

21. The method of claim 1, wherein the transmission scheduling rate is determined for a time period, and wherein a duration of the time period is based at least in part on whether one or more receive chains associated with higher order receive diversity are enabled or disabled.

22. An apparatus for wireless communication at a wireless communication device, comprising:
means for determining, based at least in part on a first number of enabled receive chains of a plurality of receive chains of the wireless communication device, a transmission scheduling rate for the wireless communication device;
means for identifying a network capability comprising a maximum supported rank for a channel;
means for determining a second number of receive chains, of the plurality of receive chains, to enable for the channel, the determining based at least in part on the transmission scheduling rate for the wireless communication device, the identified network capability, and a rank for the channel; and means for regulating power to the plurality of receive chains based at least in part on the determined second number of receive chains.

23. An apparatus for wireless communication at a wireless communication device, comprising:
a processor;
memory in electronic communication with the processor; and
instructions stored in the memory, wherein the instructions are executable by the processor to:
determine, based at least in part on a first number of enabled receive chains of a plurality of receive chains of the wireless communication device, a transmission scheduling rate for the wireless communication device;
identify a network capability comprising a maximum supported rank for a channel;
determine a second number of receive chains, of the plurality of receive chains, to enable for the channel, the determining based at least in part on the transmission scheduling rate for the wireless communication device, the identified network capability, and a rank for the channel; and
regulate power to the plurality of receive chains based at least in part on the determined second number of receive chains.

24. The apparatus of claim 23, wherein the processor and the memory are configured to:
compare the transmission scheduling rate to a first transmission scheduling rate threshold for enabling receive chains or a second transmission scheduling rate threshold for disabling receive chains.

25. The apparatus of claim 24, wherein the instructions are further executable by the processor to:
determine to disable at least one receive chain of the plurality of receive chains for the channel when the transmission scheduling rate is lower than the second transmission scheduling rate threshold; and
determine to enable a number of receive chains greater than the first number of enabled receive chains for the channel when the transmission scheduling rate for the wireless communication device is higher than the first transmission scheduling rate threshold.

26. The apparatus of claim 23, wherein the instructions executable by the processor to determine the second number of receive chains comprise instructions executable by the processor to:
compare a channel quality of the channel to a channel quality threshold;
wherein the determined second number of receive chains is based at least in part on the comparison.

27. The apparatus of claim 23, wherein the instructions are further executable by the processor to:
compare the rank for the channel to a threshold rank; and
determine to enable at least a predetermined number of the plurality of receive chains based at least in part on the comparison.

28. A non-transitory computer-readable medium storing code, the code comprising instructions executable by a processor to:
determine, based at least in part on a first number of enabled receive chains of a plurality of receive chains of a wireless communication device, a transmission scheduling rate for the wireless communication device;
identify a network capability comprising a maximum supported rank for a channel;
determine a second number of receive chains, of the plurality of receive chains, to enable for the channel, the determining based at least in part on the transmission scheduling rate for the wireless communication device, the identified network capability, and a rank for the channel; and
regulate power to the plurality of receive chains based at least in part on the determined second number of receive chains.

* * * * *